(12) United States Patent
Bélanger et al.

(10) Patent No.: US 8,690,170 B2
(45) Date of Patent: Apr. 8, 2014

(54) BODY REINFORCEMENT AND METHOD OF MANUFACTURING THEREOF

(75) Inventors: Martin Bélanger, Montreal (CA); Mathieu Boivin, Montreal (CA); Martin Gauthier, St-Hippolythe (CA)

(73) Assignee: Norduyn Inc., Montreal (CA)

( * ) Notice: Subject to any disclaimer, the term of this patent is extended or adjusted under 35 U.S.C. 154(b) by 277 days.

(21) Appl. No.: 13/106,761

(22) Filed: May 12, 2011

(65) Prior Publication Data

US 2011/0278879 A1 Nov. 17, 2011

Related U.S. Application Data

(60) Provisional application No. 61/334,581, filed on May 14, 2010.

(51) Int. Cl.
*B62B 1/00* (2006.01)
*B62B 3/00* (2006.01)

(52) U.S. Cl.
USPC ............. 280/79.3; 280/79.11; 280/47.34

(58) Field of Classification Search
USPC .......... 280/79.11, 79.2, 79.3, 47.11, 47.34, 280/47.35, 638, 639, 651
See application file for complete search history.

(56) References Cited

U.S. PATENT DOCUMENTS

| 3,625,397 A | 12/1971 | Shelly |
| 3,877,744 A | 4/1975 | Miller |
| 3,951,426 A | 4/1976 | Shaffer |
| 3,987,871 A | 10/1976 | Nordskog |
| 4,073,369 A | 2/1978 | Nordskog |
| RE30,623 E | 5/1981 | Schulz |
| 4,936,377 A * | 6/1990 | DeVogel et al. ............. 165/47 |
| 5,001,977 A | 3/1991 | Tracy |
| 5,028,761 A | 7/1991 | Oda |

(Continued)

FOREIGN PATENT DOCUMENTS

| EP | 0046414 | 2/1982 |
| EP | 0080313 | 6/1983 |

(Continued)

OTHER PUBLICATIONS

Intellectual Property Office, Patents act 1977: Search Report under Section 17(5), Related to application No. GB1107999.8, 6 page(s).

(Continued)

*Primary Examiner* — J. Allen Shriver, II
*Assistant Examiner* — James M Dolak
(74) *Attorney, Agent, or Firm* — Mathieu Audet

(57) ABSTRACT

A reinforced composite material utility cart comprising a body including two side portions interconnecting an upper portion and a bottom portion adapted to secure ground contacting members thereto is provided, at least one of the portions including composite material and a reinforcement therein adapted to distribute a concentrated stress applied on the body to the composite material to prevent or reduce damages to the composite material. A method of manufacturing a reinforced composite panel adapted to be used in the construction of a utility cart adapted to be stowed in a bay of a galley of an airplane and locked in place with a lock disposed next to the bay in a position suitable to retain the utility cart in the bay by interfering with a reinforced edge of the utility cart is also provided.

11 Claims, 22 Drawing Sheets

(56) References Cited

U.S. PATENT DOCUMENTS

| | | | |
|---|---|---|---|
| 5,056,194 A | 10/1991 | Huber | |
| 5,069,466 A | 12/1991 | Propst | |
| 5,409,245 A * | 4/1995 | Kern et al. | 280/33.996 |
| 5,449,232 A | 9/1995 | Westbrooks, Jr. | |
| 5,749,193 A | 5/1998 | Bucher | |
| 5,785,202 A | 7/1998 | Stephan | |
| 5,829,767 A | 11/1998 | Grossman | |
| 5,947,494 A | 9/1999 | Thogersen | |
| 5,979,917 A | 11/1999 | Thogersen | |
| 6,106,084 A | 8/2000 | Thogersen | |
| 6,234,498 B1 * | 5/2001 | Saku et al. | 280/47.34 |
| 6,425,649 B2 | 7/2002 | Kasuya | |
| 6,460,952 B1 * | 10/2002 | Tryon | 312/265.5 |
| 6,474,665 B1 * | 11/2002 | Fink et al. | 280/79.2 |
| 6,474,677 B2 | 11/2002 | Kasuya | |
| 6,589,458 B2 * | 7/2003 | DeCost | 264/50 |
| 6,629,581 B2 | 10/2003 | Lambiaso | |
| 7,044,335 B2 | 5/2006 | Aguirre | |
| 7,287,820 B2 | 10/2007 | Van Loon | |
| 7,394,042 B2 | 7/2008 | Fortmann | |
| 7,444,830 B2 * | 11/2008 | Moran et al. | 62/371 |
| 7,458,441 B2 | 12/2008 | Hu | |
| 7,490,838 B2 * | 2/2009 | Hyatt et al. | 280/47.35 |
| 7,544,915 B2 | 6/2009 | Hu | |
| 7,661,459 B2 | 2/2010 | Wesley | |
| 7,814,638 B2 | 10/2010 | Schalla | |
| 7,942,430 B2 * | 5/2011 | Van Loon et al. | 280/47.34 |
| 8,465,030 B2 * | 6/2013 | Boivin et al. | 280/47.34 |
| 2001/0009347 A1 * | 7/2001 | Kasuya | 312/409 |
| 2001/0010419 A1 | 8/2001 | Kasuya | |
| 2003/0042073 A1 | 3/2003 | Lambiaso | |
| 2004/0207168 A1 | 10/2004 | Raab | |
| 2004/0226960 A1 | 11/2004 | Aguirre | |
| 2005/0193760 A1 | 9/2005 | Moran | |
| 2005/0218615 A1 | 10/2005 | Hu | |
| 2006/0055290 A1 * | 3/2006 | Schalla | 312/223.1 |
| 2006/0070814 A1 | 4/2006 | Hu | |
| 2008/0042405 A1 | 2/2008 | Hu | |
| 2008/0116773 A1 * | 5/2008 | Van Loon et al. | 312/198 |
| 2008/0120187 A1 | 5/2008 | Wesley | |
| 2008/0172295 A1 | 7/2008 | Watson | |
| 2008/0172855 A1 | 7/2008 | Schalla | |
| 2008/0203043 A1 | 8/2008 | Poortvliet | |
| 2008/0216368 A1 | 9/2008 | Delamere | |
| 2008/0276840 A1 | 11/2008 | Van Loon | |
| 2009/0055290 A1 | 2/2009 | Harris | |
| 2010/0129184 A1 | 5/2010 | Thogersen | |
| 2010/0140890 A1 | 6/2010 | Boivin | |
| 2010/0155391 A1 | 6/2010 | Koschberg | |
| 2010/0243801 A1 | 9/2010 | Saint-Jalmes | |
| 2011/0006496 A1 | 1/2011 | Knoppers | |

FOREIGN PATENT DOCUMENTS

| | | |
|---|---|---|
| EP | 0289258 | 11/1988 |
| EP | 470149 | 2/1992 |
| EP | 0645129 | 3/1995 |
| EP | 678438 | 10/1995 |
| EP | 0700820 | 3/1996 |
| EP | 855868 | 8/1998 |
| EP | 0922412 | 6/1999 |
| EP | 0922413 | 6/1999 |
| EP | 0922414 | 6/1999 |
| EP | 0922415 | 6/1999 |
| EP | 936334 | 8/1999 |
| EP | 999967 | 5/2000 |
| EP | 1055528 | 11/2000 |
| EP | 1125520 | 8/2001 |
| EP | 1125521 | 8/2001 |
| EP | 1335837 | 8/2003 |
| EP | 1022185 | 10/2005 |
| EP | 1551709 | 3/2006 |
| EP | 1592614 | 9/2006 |
| EP | 1700764 | 9/2006 |
| EP | 1308110 | 3/2007 |
| EP | 1542565 | 9/2007 |
| EP | 2246243 | 11/2010 |
| WO | 9012721 | 4/1990 |
| WO | 9101098 | 2/1991 |
| WO | 9202160 | 2/1992 |
| WO | 9701475 | 1/1997 |
| WO | 9739653 | 10/1997 |
| WO | 9739654 | 10/1997 |
| WO | 9906260 | 2/1999 |
| WO | 9941479 | 8/1999 |
| WO | 0021830 | 4/2000 |
| WO | 0219231 | 3/2002 |
| WO | 0242093 | 5/2002 |
| WO | 03023993 | 3/2003 |
| WO | 2004028301 | 4/2004 |
| WO | 2004103887 | 12/2004 |
| WO | 2005085075 | 9/2005 |
| WO | 2006093410 | 9/2006 |
| WO | 2006093412 | 9/2006 |
| WO | 2007023318 | 3/2007 |
| WO | 2007061622 | 5/2007 |
| WO | 2008020084 | 2/2008 |
| WO | 2008063403 | 5/2008 |
| WO | WO2008/147176 | 5/2008 |
| WO | 2008067428 | 6/2008 |
| WO | 2008070715 | 6/2008 |
| WO | 2008070835 | 6/2008 |
| WO | 2008079345 | 7/2008 |
| WO | 2009008707 | 1/2009 |
| WO | 2009120067 | 10/2009 |
| WO | 2010020964 | 2/2010 |
| WO | 2010046479 | 4/2010 |
| WO | 2010063120 | 6/2010 |
| WO | 2010084005 | 7/2010 |
| WO | WO2010063120 | 10/2010 |

OTHER PUBLICATIONS

Patent Cooperation Treaty, PCT International Search Report, Jul. 12, 2009, 3 pages, PCT/CA2009/001771.

Patent Cooperation Treaty, PCT Written Opinion of the International Searching Authority, Jul. 12, 2009, 5 pages, PCT/CA2009/001771.

* cited by examiner

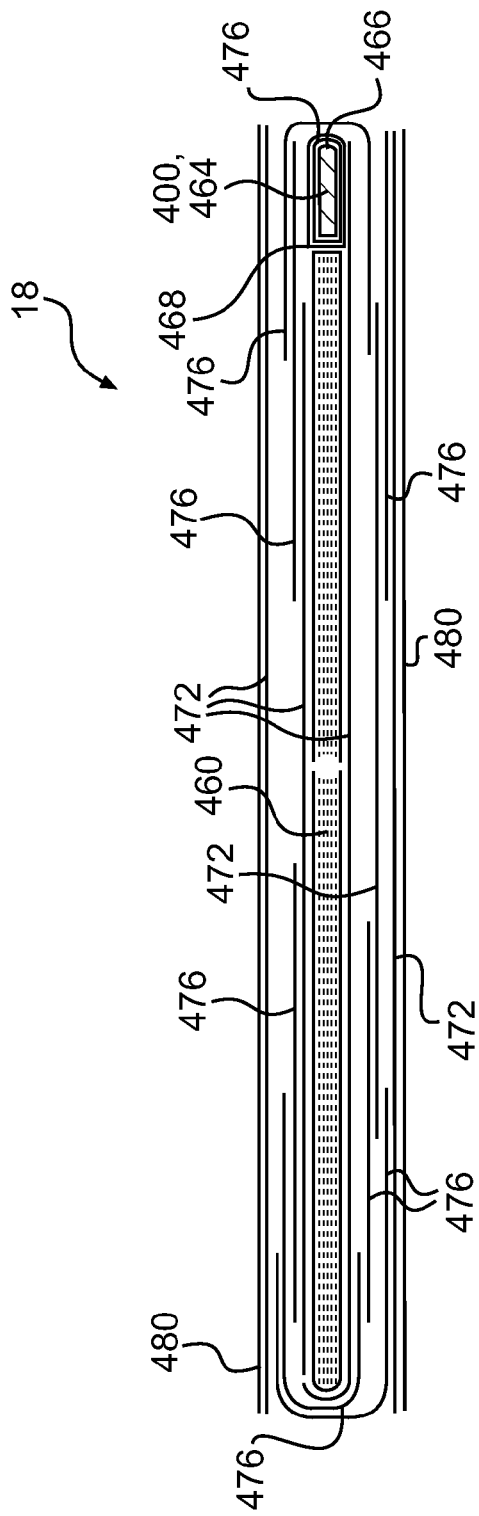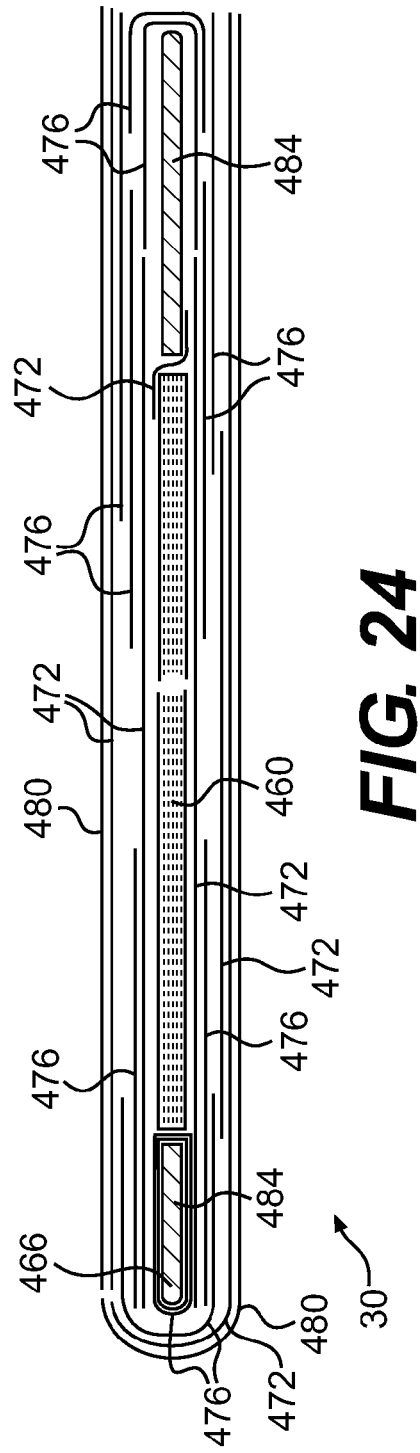

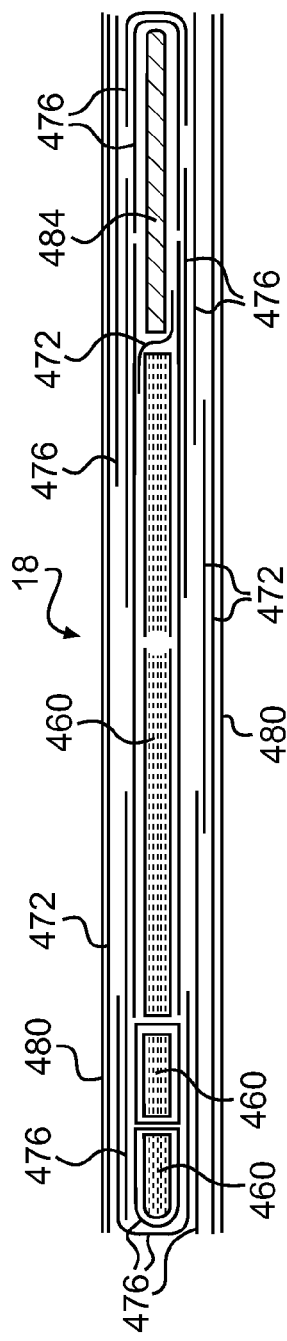
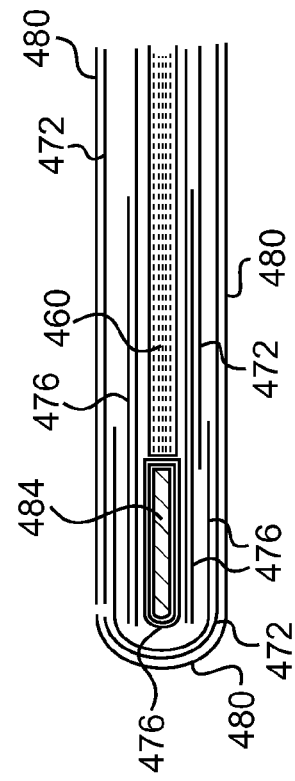
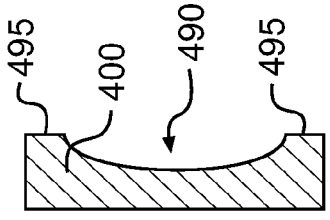
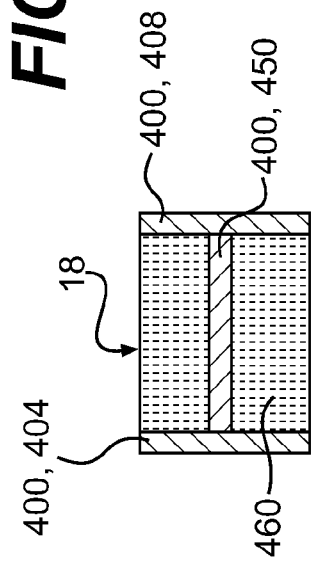
FIG. 25
FIG. 26
FIG. 27
FIG. 28

BODY REINFORCEMENT AND METHOD OF MANUFACTURING THEREOF

CROSS-REFERENCE

The present invention relates to and claims priority from U.S. Provisional Patent Application No. 61/334,581 filed May 14, 2010, entitled UTILITY CART STRUCTURE, incorporated herein by reference.

FIELD OF THE INVENTION

This invention relates generally to a utility cart for moving objects. More precisely, the present invention relates to a reinforced composite material utility cart body construction.

BACKGROUND OF THE INVENTION

Utility carts are used in the transport industry to perform different tasks. They carry goods along alleys and can be configured to serve drinks, food, sell goods and collect garbage, among other tasks. Legacy carts are made in aluminum that makes them strong but heavy. It is therefore desirable to have a utility cart that is lighter to move and handle.

Lighter utility carts made of composites materials are becoming more and more popular. Composite materials offer a better strength/weight ratio than most isotropic materials. Composites materials are lighter than metals, like aluminum, because they are designed to provide material where it is the most needed to sustain mechanical loads applied thereon. Generally, composite material products are strong on their overall structure but are rather weak to sustain loads locally applied thereto.

Utility carts used in the aircraft industry are subjected to aeronautical regulations. Some regulations are directed to fire resistance while others are related to mechanical stresses resistance. SAE Aerospace Standard AS 8056 is an example of regulations applicable to utility carts intended to be used in airplanes.

Physical tests are performed on utility carts to ensure they meet each mandatory requirement. Some tests are adapted to verify if the utility cart resists to local impacts. For example, aerospace standards require a utility cart to sustain direct local loads/stresses applied on some portions of the utility cart. The utility cart needs to sustain concentrated loads of many G's (1G being one time the Earth's gravity) without suffering significant damages. In the present situation, loads equivalent to 9G must be bore by the utility cart.

At least one of the requirements refers to a load applied on some portions of the utility cart. Specific tests try to simulate the load applied by the locking member securing the utility cart in the galley of an airplane. The load is applied in the plan defined by the upper portion of the utility cart and in a direction orthogonal with the front portion of the utility cart. Such a concentrated load generally exceeds the strength of the composite material used to build the utility cart structure.

It is therefore desirable to find an improved composite material utility cart structure over the existing art. It is also desirable to find a composite material that is prone to support concentrated loads applied to a wall portion of the utility cart.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, the present invention improves at least some of the deficiencies associated with the drawbacks identified above in accordance with at least one embodiment of the present invention.

The present invention provides a composite structure that is adapted to better sustain concentrated loads applied to a composite materials utility cart in accordance with at least one embodiment of the present invention.

The present invention provides a variety of means to distribute the stress applied to a composite wall of a utility cart in accordance with at least one embodiment of the present invention.

The present invention provides a reinforced top portion of a utility cart that comprises a reinforcement member embedded therein in accordance with at least one embodiment of the present invention.

The present invention provides a composite material utility cart provided with means to increase its resistance to concentrated mechanical stress applied thereon in accordance with at least one embodiment of the present invention.

The present invention provides a utility cart provided with a reinforcement located in the composite material wall of the utility cart that is wrapped with a series of layers of fibers to increase its resistance to concentrated mechanical stresses applied thereon in accordance with at least one embodiment of the present invention.

The present invention provides a utility cart comprising a body including two side portions interconnecting an upper portion and a bottom portion adapted to secure ground contacting members thereto is provided, at least one of the portions including composite material and a reinforcement therein adapted to distribute a concentrated stress applied on the body to the composite material to prevent or reduce damages to the composite material.

The present invention provides a method of manufacturing a reinforced composite panel adapted to be used in the construction of a utility cart adapted to be stowed in a bay of a galley of an airplane and locked in place with a lock disposed next to the bay in a position suitable to retain the utility cart in the bay by interfering with a reinforced edge of the utility cart is also provided.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 23 is a schematic sectional view of a portion of a composite wall member with reinforcements therein in accordance with an embodiment of the invention;

FIG. 24 is a schematic sectional view of a portion of a composite wall member with reinforcements therein in accordance with an embodiment of the invention;

FIG. 25 is a schematic sectional view of a portion of a composite wall member with reinforcements therein in accordance with an embodiment of the invention;

FIG. 26 is a schematic sectional view of a portion of a composite wall member with reinforcements therein in accordance with an embodiment of the invention;

FIG. 27 is a schematic isolated reinforcement in accordance with an embodiment of the invention; and FIG. 28 is a schematic view of a portion of a composite wall member with reinforcements therein in accordance with an embodiment of the invention.

DESCRIPTION OF EMBODIMENT(S) OF THE INVENTION

Figure 1:
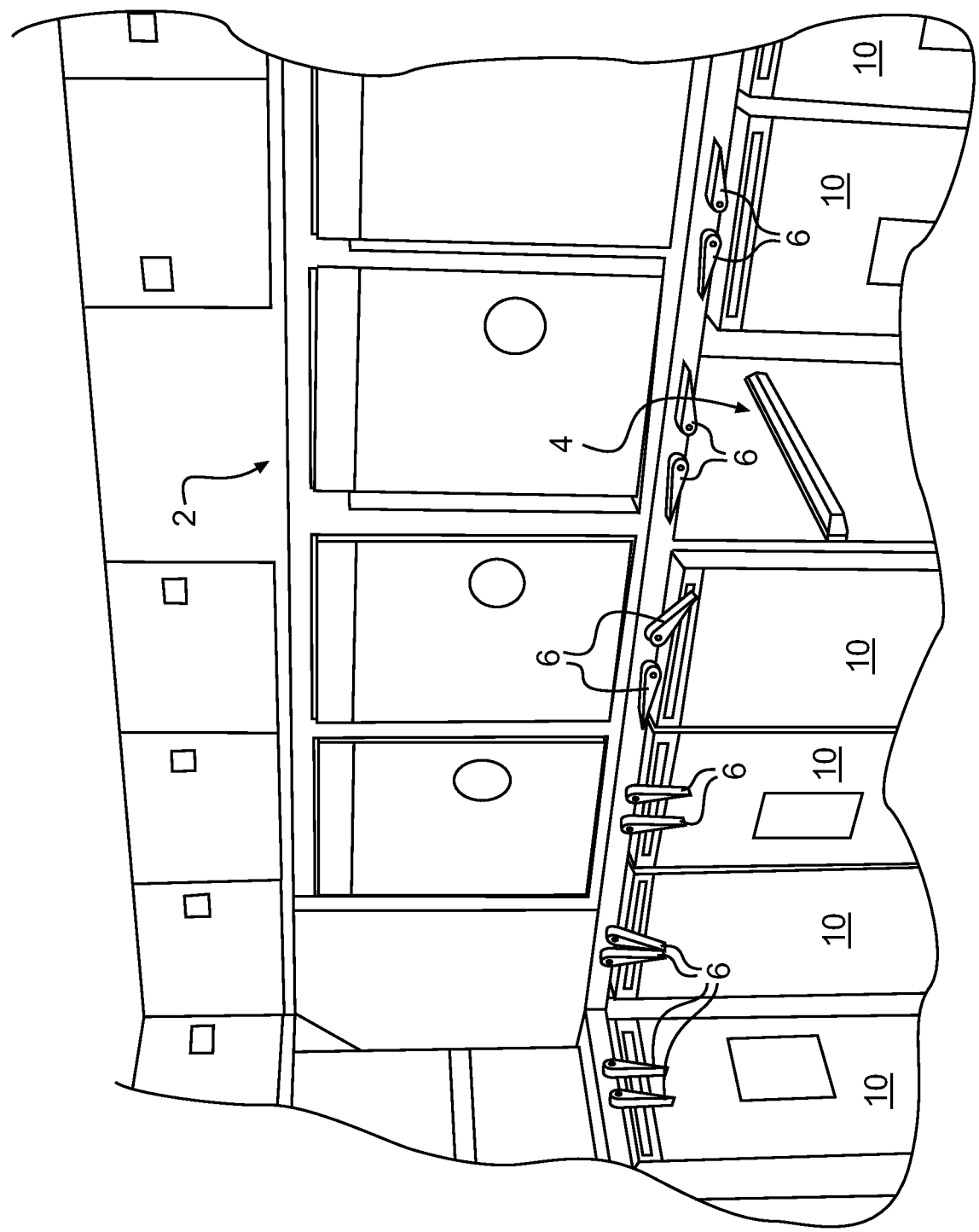
FIG. 1 is a perspective view of an airplane's galley having a series of utility cart receiving bays with utility carts inserted therein in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in schematic form in order to facilitate describing the present invention.

FIG. 1 illustrates a typical airplane galley 2 including a plurality of bays 4 adapted to respectively receive therein a utility cart 10. Each utility cart 10 is sized and designed to fit into its respective bay 4 and be secured by one or many pivotable locks 6 adapted to restrain the utility cart 10 in its bay 4. Locks 6 are sized and designed to retain the utility cart 10 in case of accident and therefore sustain significant loads thereof. The lock 6 generally secures an upper portion 18 of the utility cart 10 and can alternatively secure a side or a bottom portion of the utility cart 10.

Figure 2:
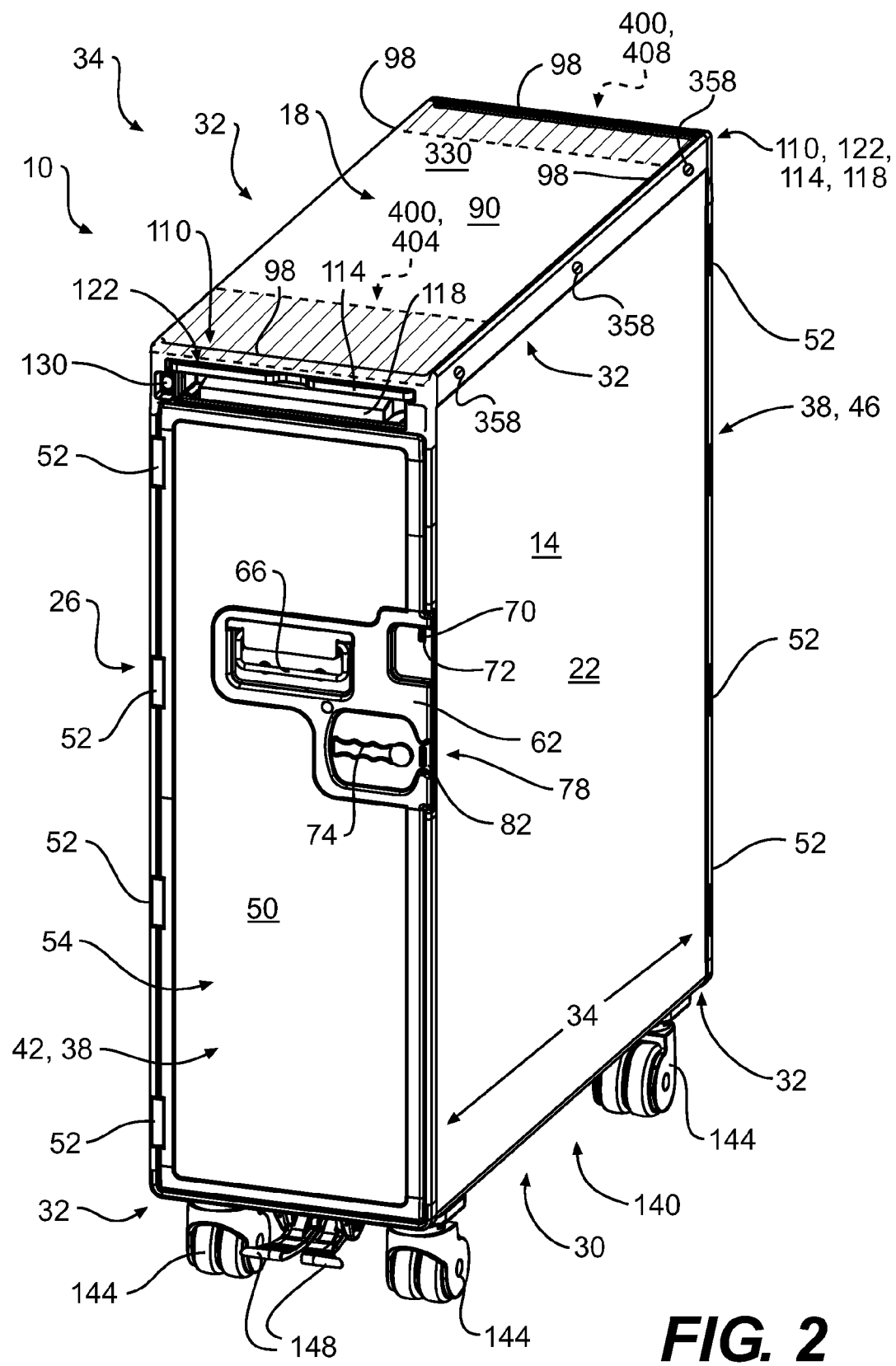
FIG. 2 is a perspective view of a full size utility cart with a reinforcement therein in accordance with an embodiment of the present invention.

A utility cart 10 adapted to carry goods is illustrated in FIG. 2 and used throughout the present specification to present a tangible exemplary use of embodiments of the invention. The utility cart 10 is adapted to be used in a passenger airplane. The utility cart 10 could alternatively be used in other environments like in a passenger train or, inter alia, in the medical field to distribute medicine or food. The utility cart 10 illustrated in FIG. 2 comprises a body 14 defining an upper portion 18, a right lateral portion 22, a left lateral portion 26 and a bottom portion 30. The body 14 of the utility cart 10 can be described as a monocoque construction 34 simultaneously providing the aesthetic envelope of the utility cart 10 and the structure providing its overall mechanical strength. In other words, the monocoque construction 34 provides an envelope that also serves as structural body 14 of the utility cart 10. As it will be described below in respect with at least one embodiment, the monocoque construction 34 can form a body 14 made of a single part.

In the illustrated embodiment, the upper portion 18, the right lateral wall portion 22, the left lateral wall portion 26 and the bottom wall portion 30 of the body 14 are connected together in a continuous wall. Illustrative embodiments described herein are using radius portions 32 to interconnect adjacent wall portions 18, 22, 26, 30. The body 14 of the illustrated embodiment forms a tubular member having four planar wall portions 18, 22, 26, 30 made of a single part. Wall portions 18, 22, 26, 30 can be secured together to form the body 14 in a first configuration while, alternatively, the four planar wall portions 18, 22, 26, 30 can be produced separately and later assembled in a unitary body 14 in a second configuration. Both configurations can be defined as forming a monocoque structure and can vary in terms of their overall shape and size.

It can be appreciated that the thickness of the wall portions 18, 22, 26, 30 can have different thicknesses adapted to sustain specific mechanical loads applied thereto. In other words, the monocoque construction 34 can be optimized to only use the required quantity of material at the right place and therefore reduce the weight of the utility cart 10 while providing the appropriate mechanical resistance thereof. For example, the upper portion 18 can have a thinner wall section than the bottom portion 30 because the upper portion 18 does not bear the weight of the entire utility cart 10 and its content. Additional details about the construction of the body 14 will be provided below.

Figure 5:
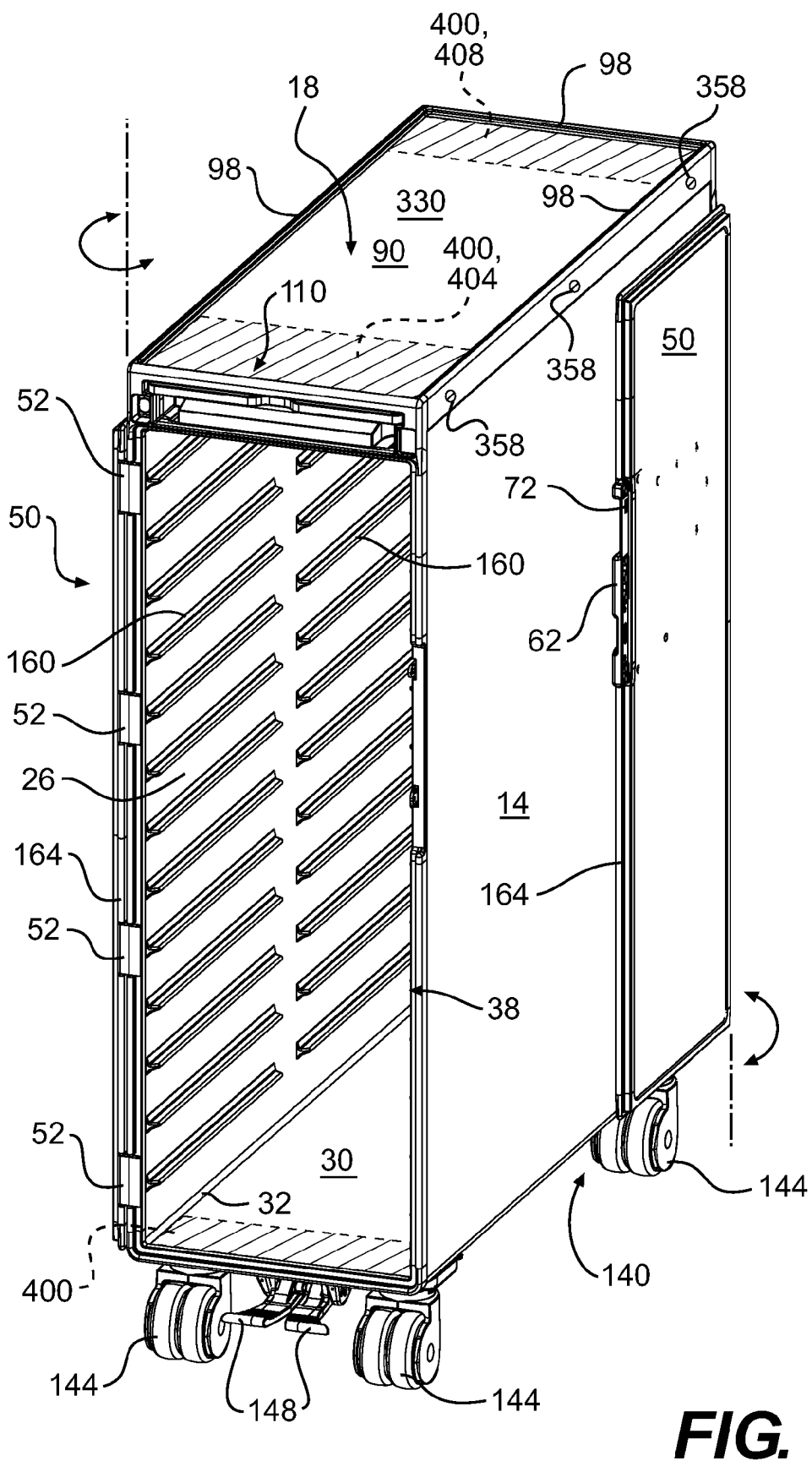
FIG. 5 is a perspective view of a full size utility cart with opened doors and reinforcements therein in accordance with an embodiment of the present invention.

More precisely, the utility cart 10 illustrated in FIG. 2 is a full-size utility cart 10 having a predetermined longitudinal length 36 and provided with a door opening 38 on each longitudinal side 42, 46. Each door 50 is hingedly 52 connected to the body 14 and is adapted to pivot between a closed position 54, when mating with its respective door opening 38, and an opened position 58 as illustrated in FIG. 5. A reinforcement member 62 recessed into the door 50 provides support for a pull handle 66 pivotally secured thereon and adapted to open the door 50. A locking member 70 protruding from the door opening 38 and passing through a corresponding opening 72 in the door 50, when the door 50 is in the closed position 54, to receive a lock (not shown) thereon to prevent opening of the door 50 is also connected to the reinforcement member 62. A handle 74 is pivotally secured to the reinforcement member 62 to selectively disengage a retractable lock member 78 from a cooperating extending stem 82 to open the door 50. The handle 74 can be actuated in both the upward and downward directions to retract the lock member 78 to allow unlocking and opening of the door 50.

Still referring to FIG. 2, the utility cart 10 is provided with a cover element module 90 illustratively made of molded plastic or thermo-plastic material to cover the upper portion 18 of the body 14. The cover element module 90 is a portion of the utility cart 10 adapted to specialize the utility cart 10 for better assisting specific tasks while keeping the remaining portions of the utility cart 10 substantially unchanged. The cover element module 90 of the present embodiment can be permanently secured to the body 14 with glue, fasteners, or the like, to improve the shape of the upper portion 18 into a planar working area 94 defined by a peripheral ridge 98 configured to prevent objects or liquids to slide off the upper portion 18 of the body 14. Alternatively, the cover element module 90 is secured via a securing element 86.

Utility cart utility modules are portions of the utility cart 10 that can be changed for specializing the utility cart 10 without changing the body 14 of the utility cart 10. The modules can be located at various positions on the utility cart 10 despite the illustrative examples presented herein are mostly only using the upper portion 18 of the utility cart 10 to receive modules thereto. The modularity of the present invention can be directed to the utility cart 10 manufacturing process by selecting the desired module at the time of permanently assembling the utility cart 10 once the specific intended task of the utility cart 10 is known from the client. The modularity of the present invention can equally be directed to ongoing modifications to the utility cart 10 along its useful life by using non-permanent securing means to secure the module to the utility cart 10.

Figure 3:
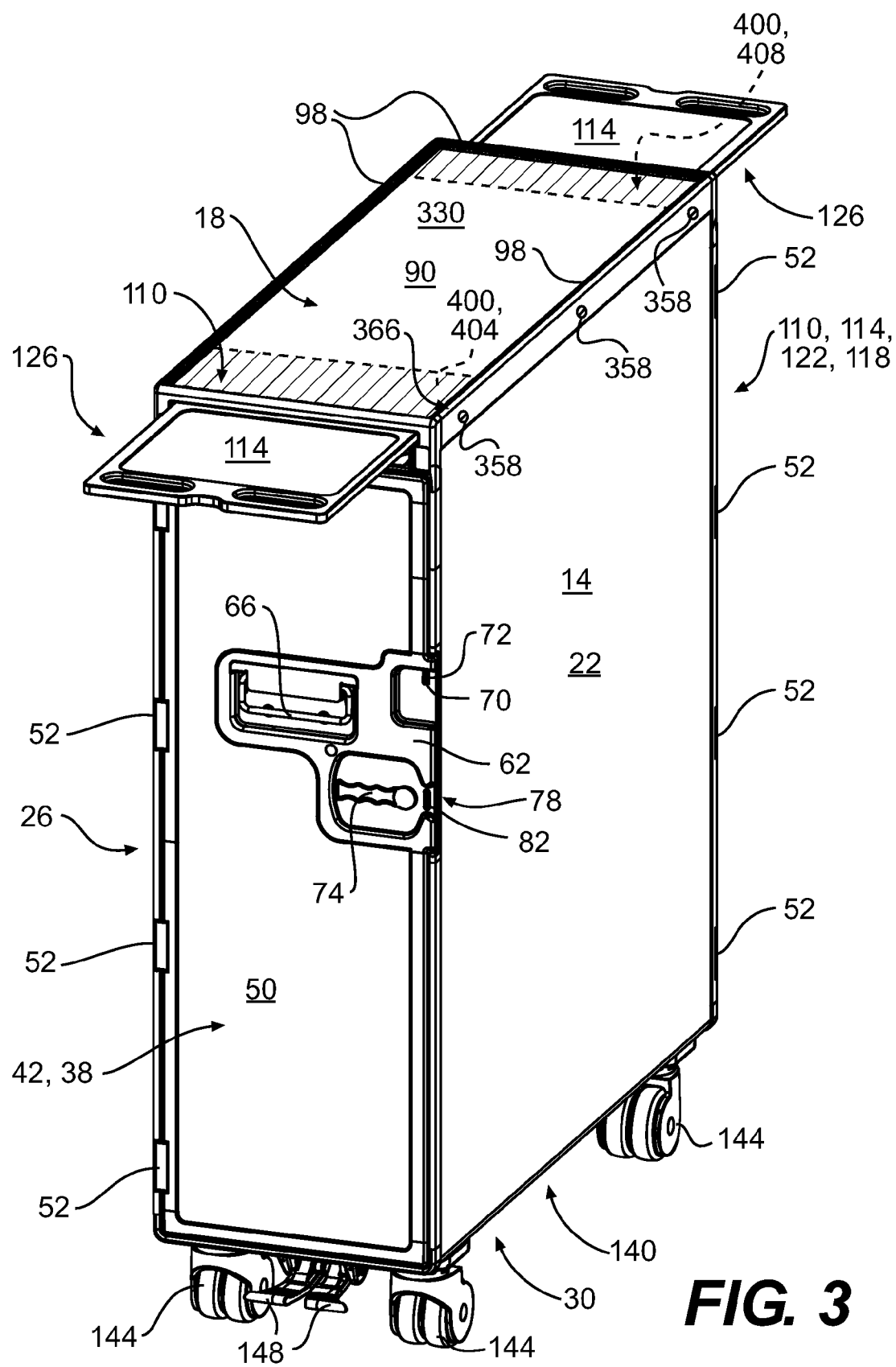
FIG. 3 is a perspective view of a full size utility cart with a reinforcement therein illustrated with extended tablets thereof in accordance with an embodiment of the present invention.

In the present embodiment, a tablet module 110 is secured inside the body 14, adjacent to the upper portion 18. The tablet module 110 of the illustrated embodiment comprises an extendable tablet 114 and an adjacent extendable receptacle 118. Dry ice (or means to cool) can be put in the extendable receptacle 118 to cool the interior of the utility cart 10. The extendable tablet 114 is moveable between a closed position 122 and an opened position 126 as it can better be appreciated in FIG. 2 and FIG. 3. A locking mechanism 130 actuated with a button in the present embodiment prevents the extendable receptacle 118 to extend when undesired. Two handles 134 are defined in the extendable tablet 114 and are accessible when the extendable tablet 114 is slightly extended to drive the utility cart 10, when desired.

Continuing with FIG. 2, the bottom portion 30 rests on a wheelbase module 140 adapted to pivotally secure thereto four (4) sets of caster wheels 144. The wheelbase module 140 is permanently or removably secured to the bottom portion 30 of the body 14. Two pedals 148 are also pivotally secured to the wheelbase module 140 to selectively lock or unlock the caster wheels 144 to immobilize the utility cart 10 with an operative mechanism.

Reinforcements 400 in the upper portion 18 are displayed in FIG. 2. As it is known in the art, composite materials are anisometric materials adapted to be used in the manufacturing of light components. However, composite materials are generally recognized to be poor in sustaining local mechanical stresses. Some parts of the utility cart 10 are subjected to potential high local mechanical stresses. These stresses could be applied to the upper portion 18 or any other portions of the body 14 that is used to interfere with locks 6 of the galley 2 to maintain the utility cart 10 in the bay 4. Two reinforcements 400 are illustrated in the utility cart 10, one in the front 404 and the other in the rear 408 of the upper portion 18. These reinforcements 400 are molded in the composite materials to add more strength to both the front and the rear edges of the upper portion 18 by being made with a material stronger than the composite materials so that localized mechanical stresses are distributed to a wider composite material area to prevent breaking the composite materials. Otherwise, the amount of composite materials required to sustain the same localized stresses would be significantly more important, hence being heavier and more costly. Reinforcements 400 are illustrated in the following Figures and are discussed in more details below.

Figure 4:
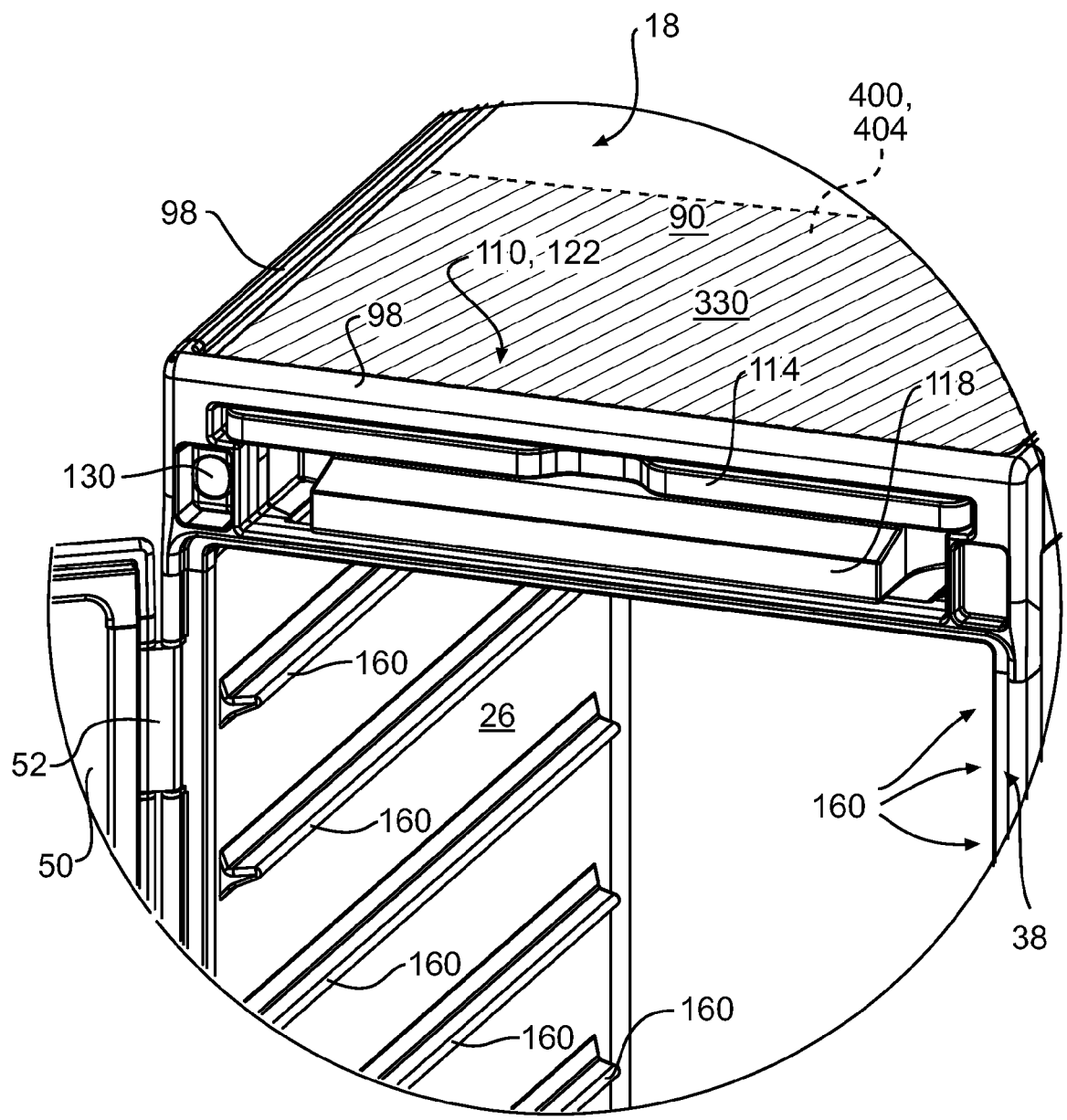
FIG. 4 is a magnified view of a utility cart with a reinforcement therein in accordance with an embodiment of the present invention.

FIG. 4 is a magnified view of the tablet module 110. The semi-opened door 50 allows seeing the interior of the utility cart 10 where a series of receptacles-supporting parallel rails 160 are visible. The series of rails 160 are secured to the interior side of the lateral wall portions 22, 26 at a constant interval thereto to slideably receive receptacles, bins or drawers (not illustrated) thereon. Openings (not visible) disposed on the lower portion of the extendable receptacle 118 are allowing cold air to pass through the extendable receptacle 118 and propagate to the rest of the body 14 to cool goods located therein.

FIG. 5 illustrates the full size configuration utility cart 10 with the doors 50 in their respective opened position 58. Each door 50 can open 58 in a position parallel to an adjacent lateral wall 22, 26. For doing so, the hinge 52 is provided with a double pivot axis adapted to distance the side of the door 50 from the door opening 38 and allow parallel proximity with one of the lateral wall portions 22, 26. A magnet can be used to keep the door 50 temporarily affixed to its respective lateral wall portion 22, 26 in the open position 58. FIG. 5 also illustrates a reinforcement 400 applied to the bottom portion 30 of the utility cart 10. The reinforcement 400 has a similar role as its counterparts 404, 408 disposed in the upper portion 18 and protects the front edge of the bottom portion 30 against damages caused by significant local mechanical stresses.

Figure 6:
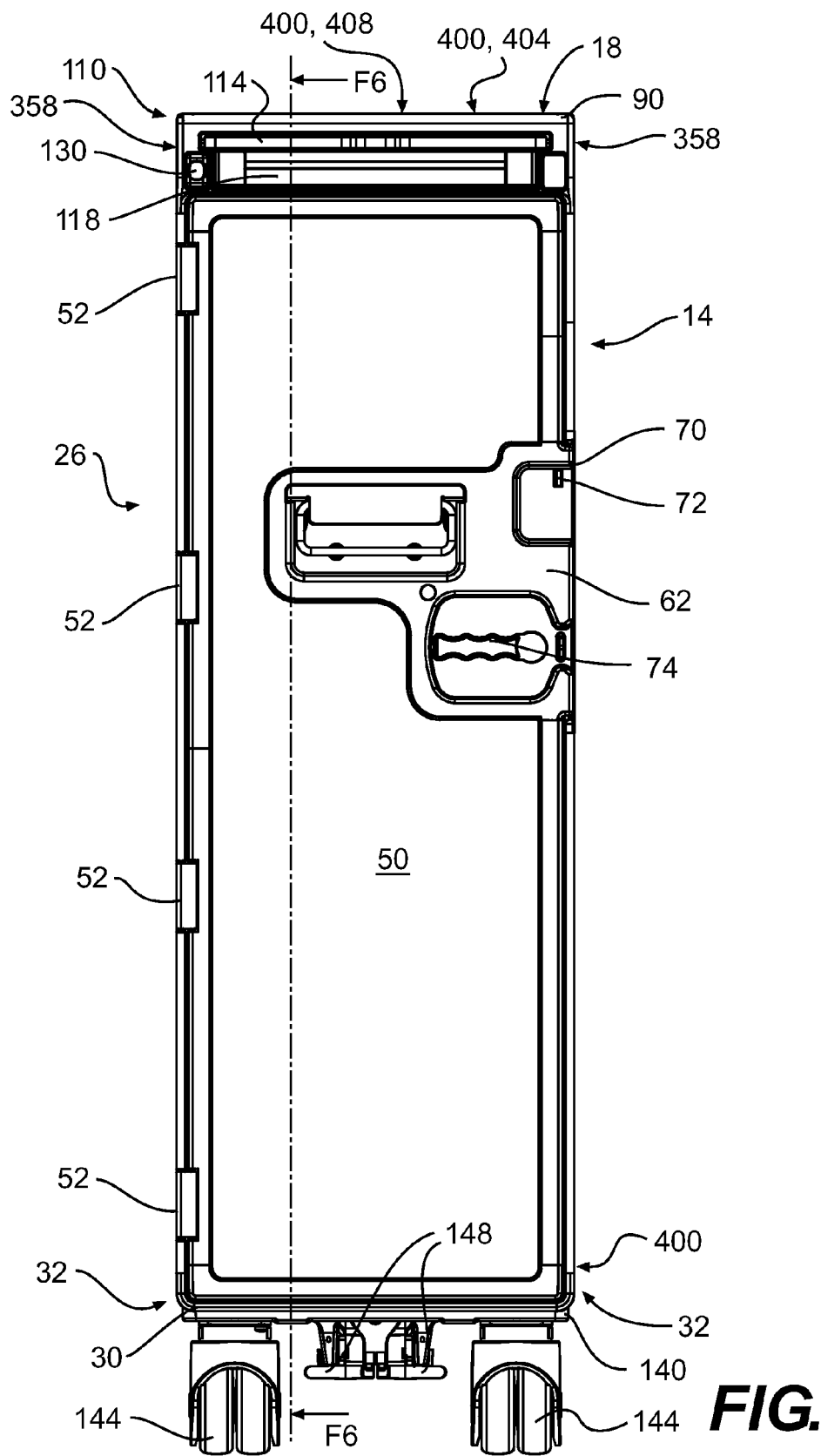
FIG. 6 is a front elevational view of the full size utility cart of FIG. 1 with reinforcements therein in accordance with an embodiment of the present invention.
Figure 7:
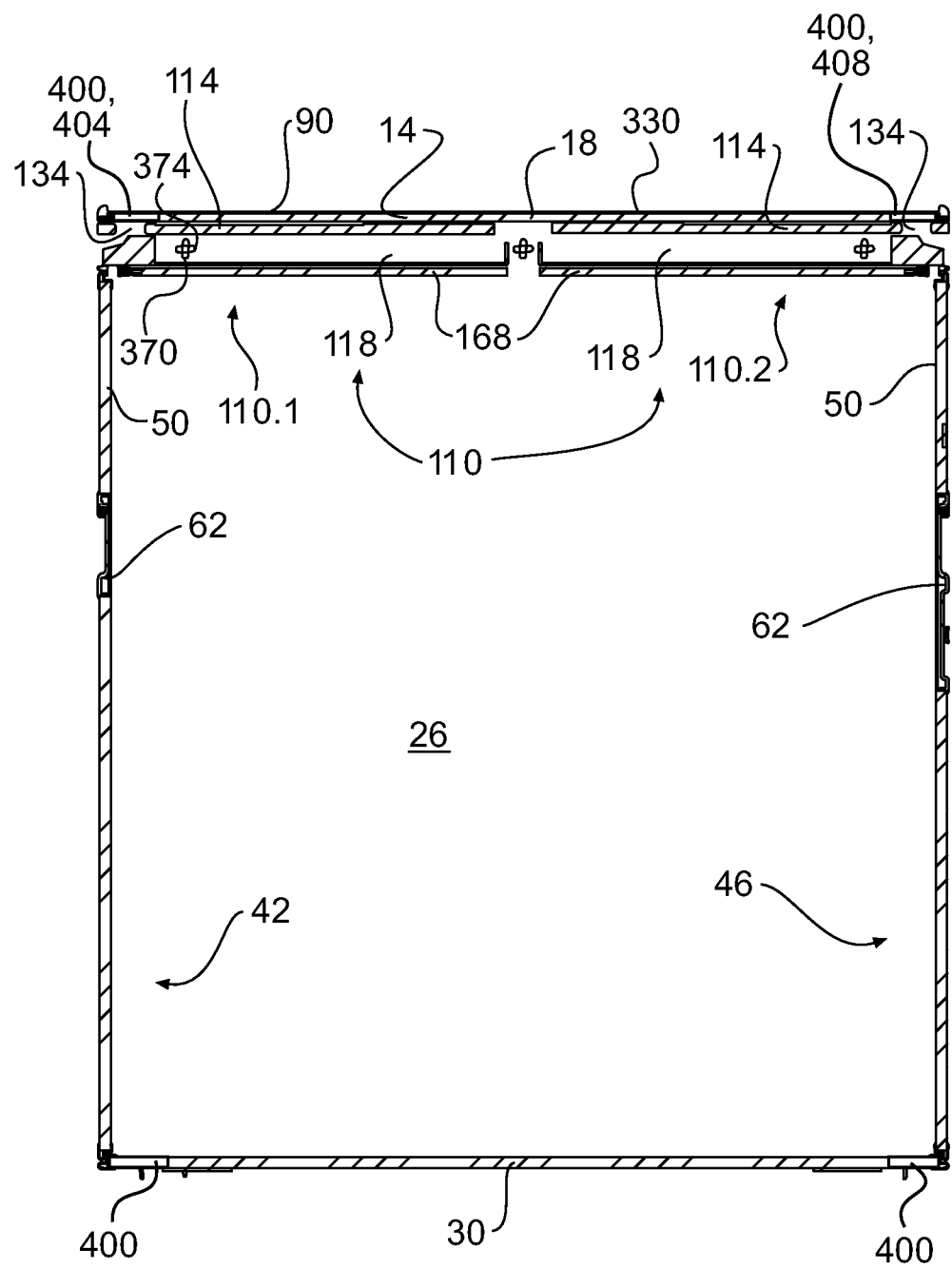
FIG. 7 is a right side elevational section view the full size utility cart of FIG. 1 with reinforcements therein in accordance with an embodiment of the present invention.

Turning now to FIG. 6 depicting the utility cart 10 and a section line representing the cut location of the section view illustrated in FIG. 7. FIG. 7 put further emphasis on the mechanical layout of the tablet module 110 inside the body 14. The full size utility cart 10 comprises two opposed tablet modules 110.1, 110.2. In other words there are two opposed extendable tablets 114 and two extendable receptacles 118 to respectively be used on each longitudinal side 42, 46 of the full size utility cart 10. Each tablet module 110 has a lower wall 168 sized and designed to be secured on each side to the lateral wall portions 22, 26. The tablet modules 110 of the present embodiment are located inside the body 14 of the utility cart 10 as opposed to the outside of the body 14. Alternatively, the tablet modules 110 could be located outside the body 14 on top of the upper portion 18 and covered by an appropriate cover element module 90.

Figure 8:
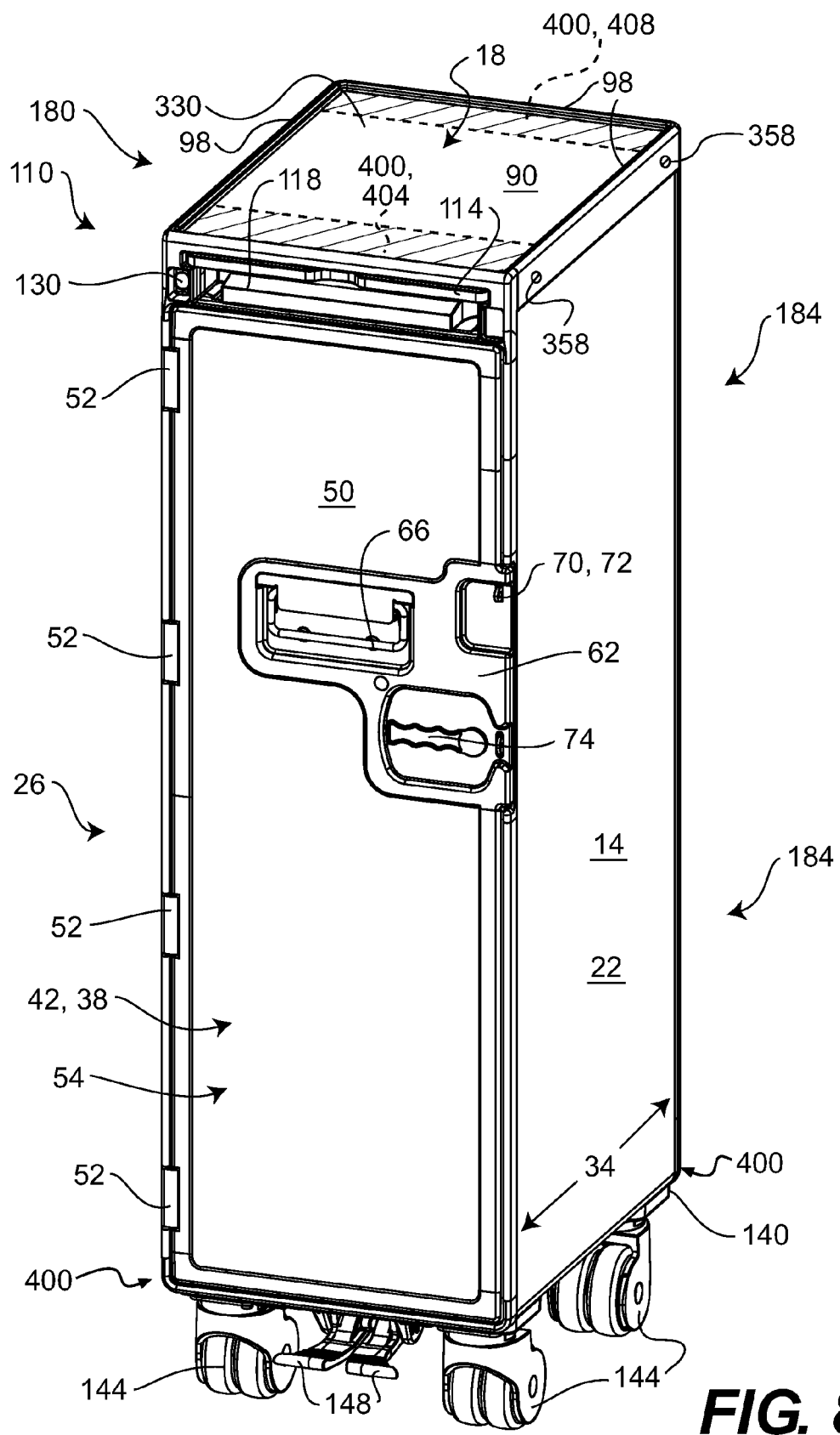
FIG. 8 is a perspective view of a half size utility cart with reinforcements therein in accordance with an embodiment of the present invention.

The full size utility cart 10 illustrated in FIG. 2 has a smaller counterpart. A half-size utility cart 180, as illustrated in FIG. 8, has a smaller size due to its shorter longitudinal length 36. The smaller volume of the half size utility cart 180 can contain fewer goods therein but allows more nimble movements. We refer herein to a half-size utility cart although it could not exactly be half the size of its larger counterpart.

Figure 9:
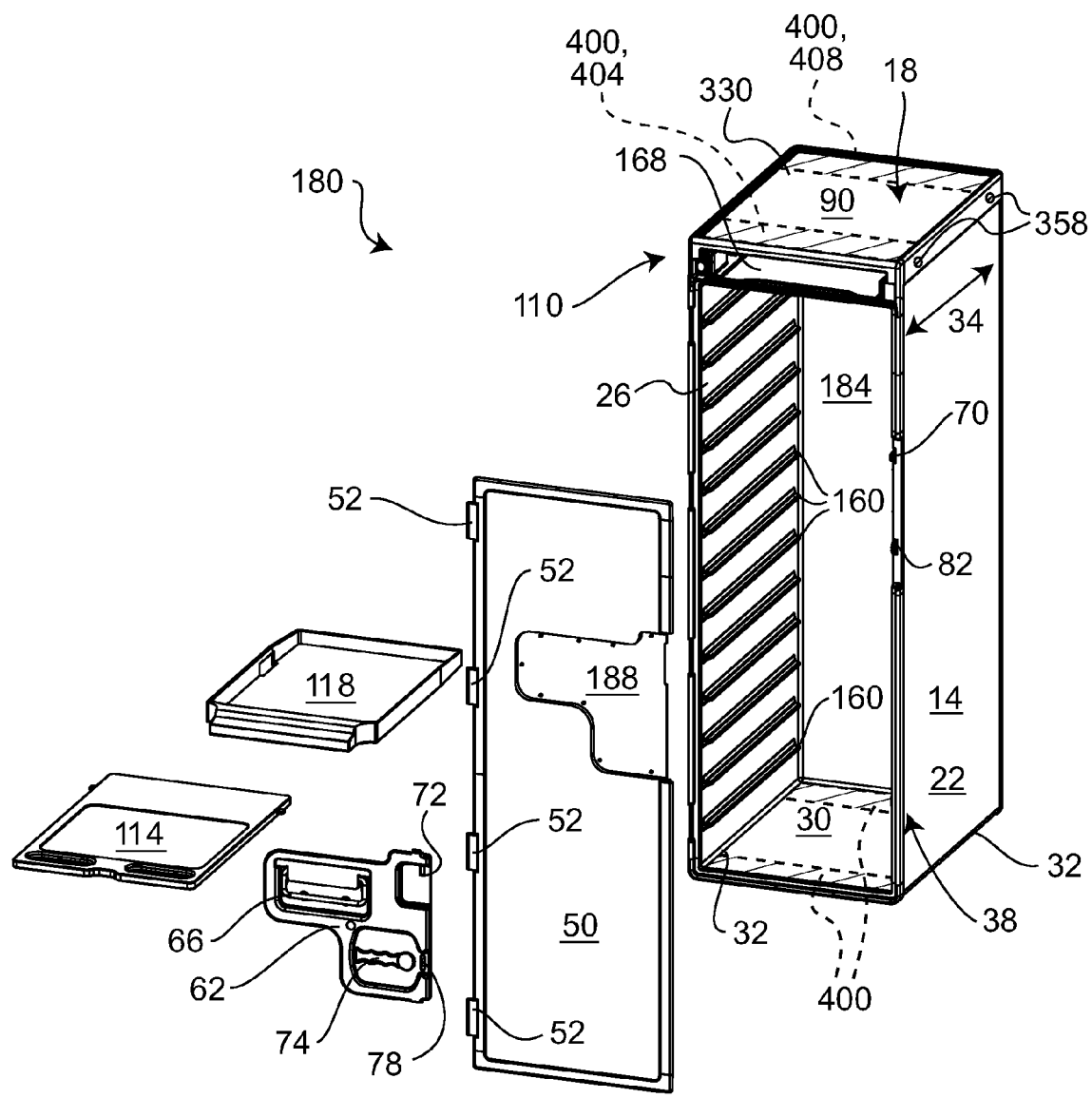
FIG. 9 is an exploded perspective view of a half size utility cart with reinforcements therein in accordance with an embodiment of the present invention.

As it is called, the half size utility cart 180 of the present embodiment is about half the length of the full size utility cart 10. This is mainly obtained by reducing the longitudinal length 36 of the body 14 and the cover element module 90 and by using a single tablet module 110, a single door 50 and closing the opposite longitudinal side with a back portion 184 that can better be appreciated in exploded FIG. 9. Beside the shorter longitudinal length 36, the components of the half size trolley 180 are substantially similar as the components of the full size trolley 10. It can further be seen in FIG. 9 that the door 50 has a recessed portion 188 sized and designed to receive therein the lock member 62 such that the lock member 62 and the locking components located thereon do not significantly extend over the external surface of the door 50. Reinforcements 400 applied to both the front and the rear edges of the upper portion 18 and the bottom portion 30 of the utility cart 10 are also illustrated.

Figure 10:
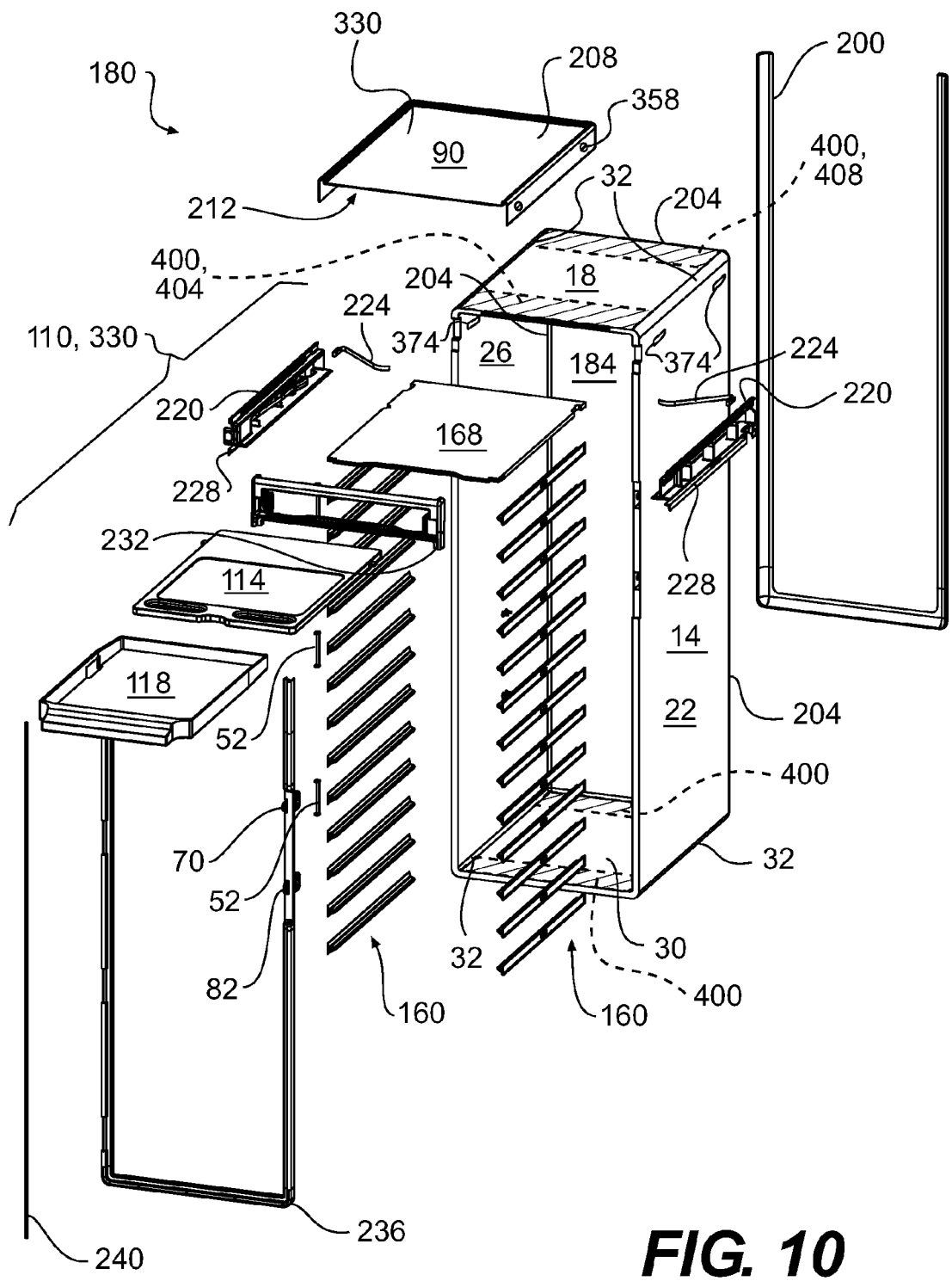
FIG. 10 is an exploded perspective view of a half size utility cart with reinforcements therein in accordance with an embodiment of the present invention.

FIG. 10 illustrates the half size utility cart 180 in a more detailed exploded view. It is first possible to appreciate that four reinforcement members 400 are disposed in the upper portion 18 and the bottom portion 30 of the composite body 14. Many parts are secured to the composite materials body 14 of the utility cart 180. These parts are preferably secured with securing mechanisms discussed in more details below. Beginning from the back of the utility cart 180 it can be appreciated there is a resilient member 200 illustratively adapted to cover the rear edges 204 of the body 14. The resilient member 200 is preferably made of a material capable of absorbing shocks, like rubber, plastic or the like. Additional resilient members 200 can be added on other portions of the utility cart 180 where needed to protect the body 14, or other parts of the utility cart 180, against exterior objects that could damage the utility cart 180. The parts are affixed to a half size utility cart 180 in the present embodiment but could also be affixed to the full size utility cart 10 without departing from the scope of the present invention.

The cover element module 90 used on a half size utility cart 180 is obviously smaller than the cover element module 90 adapted to be used in conjunction with a full size utility cart 10 as illustrated in FIG. 2. As previously mentioned, the cover element module 90 is preferably made of thermoformable or thermoset polymeric material because it is easy to shape, its low cost, its light weight and the optional additional desirable features that could be added (i.e. ridges, grooves, logos ...) thereon. Anti-slip texture can be added on the upper surface 208 of the cover element to prevent objects to slip thereon, to help liquid to drain or to prevent undesired noise to be produced when objects are put thereon. Similarly, a texture could be added on the lower surface 212 to improve adhesion between the cover element module 90, the upper portion 18 and the side portions 22, 26 of the body 14. This might be desirable when the cover element module 90 is glued to the body 14.

Still in FIG. 10, the tablet module 110 is extracted from the interior of the body 14. The extendable tablet 114 and the extendable receptacle 118 are dismantled from the side guides 220 in which they operatively slide between their respective extended and retracted positions. The extendable tablet 114 and/or the extendable receptacle 118 are optionally spring loaded with spring blades 124 located at the rear of the tablet module 110 to facilitate their extensions when they are fully retracted in the body 14. A connection between one end 224 of the spring blade 124 and its related side guide 220 locates the spring 124 in a position where the spring blade 124 stores energy therein when the extendable tablet 114 and/or the extendable receptacle 118 are retracted in the body 14. The energy stored in the spring blade 124 is restored when the locking mechanism unlocks the extendable tablet 114 and/or the extendable receptacle 118 from its recessed position to push the tablet 114 or the receptacle 118 out. Additional springs 124 associated with the tablet module 110 to preload an additional extendable tablet 114 and/or an additional extendable receptacle 118 are alternatively provided. Each side guide 220 is secured to the interior wall surface of the body 14 at the appropriate height.

The side guides 220 of an embodiment of the present invention can be glued or secured otherwise to the body 14, using or not, an intervening part 228. The present embodiment uses a pair of intervening parts 228 to interface between respective side guides 220 and the body 14. These additional intervening parts 228 are desirable to better locate the side guides 220 before mounting the whole tablet module 110 in the body 14 as opposed to trying to secure the complete tablet module 110 in the body 14. This is very convenient, when the tablet module 110 is glued to the body 14, to glue the intervening parts 228 to the body 14 and maintains it with a jig, wait for the glue to cure and then secure the remaining parts of the tablet module 110 to the body 14. The side guides 220 are also useful to removably secure the tablet module 110 or another module thereon. Another embodiment of the invention uses fasteners to secure the side guides 220 to the body 14 therefore allowing the side guides 220 to be removed if needed. Some means to secure parts to a composite body 14 are detailed below. An alternate embodiment of the invention provides a removable securing mechanism allowing easy and quick removal of the side guides 220 to install some other desirable features that are useful when the utility cart 180 is in use for some tasks. A front panel 232 is located in front of the tablet module 110 and acts as a finishing element having an aesthetic value. In the present embodiment, the front panel defines an opening adapted to let the extendable tablet 114 and/or the extendable receptacle 118 pass through.

FIG. 10 also depicts a door-opening frame 236 having a profile adapted to mate with edges of the body 14 on one side and to receive the door 50, in the closed position 54, on the other side—not illustrated in FIG. 10 but illustrated in FIG. 2. The door-opening frame 236 is firmly anchored on the edge of the body 14 and could be secured in place with adhesive and/or a securing means illustrated below. In the illustrated embodiment the locking member 70 and the extending stem 82 are molded in the door-opening frame 236 to ensure sufficient stiffness and avoid transferring directly the load to the body 14. Alternatively, the locking member 70 and the extending stem 82 are glued to the door-opening frame 236. Another embodiment firmly secures the locking member 70 and the extending stem 82 to the body 14 with fasteners and extends through associated openings performed in the door-opening frame 236. Additionally, the door-opening frame 236 further defines a portion of the hinge 52 pivotally securing the door 50 to the body 14. A hinge pivot 240 can be seen in FIG. 9. The long hinge pivot 240 is inserted through alternate openings in the door-opening frame 236, the door 50 and the smaller hinge members associated with reference number 52 in FIG. 10.

Figure 11:
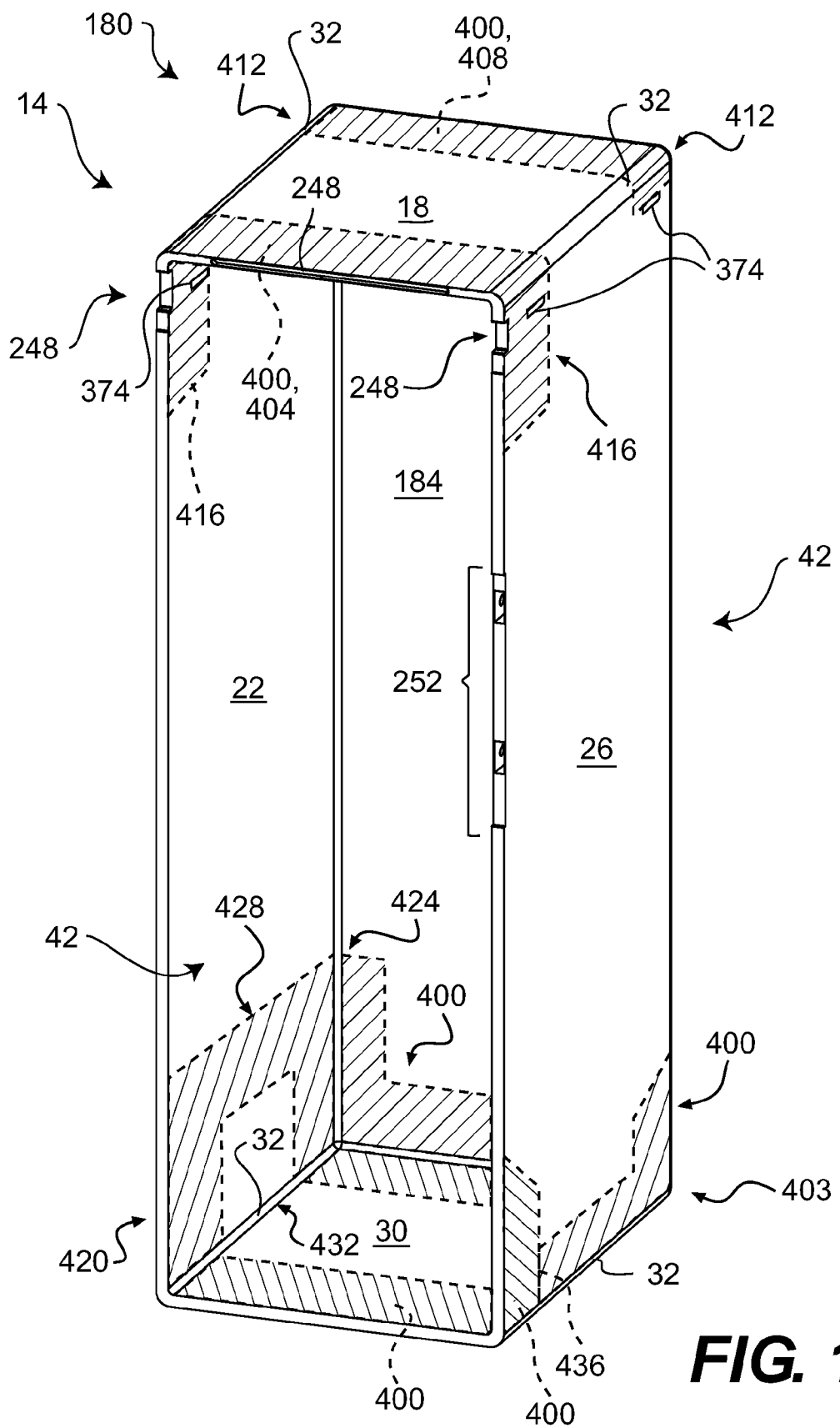
FIG. 11 is a perspective view of a body of a half size utility cart with reinforcements therein in accordance with an embodiment of the present invention.

Turning now to FIG. 11 illustrating a body 14 defining the aforementioned upper wall portion 18, right lateral wall portion 22, left lateral wall portion 26, bottom wall portion 30 and, because this is the body of a half size trolley 180, a back wall portion 184. In one embodiment, the upper wall portion 18, right lateral wall portion 22, left lateral wall portion 26 and bottom wall portion 30, interconnected with radius portions 32, are made of a single part and the back wall portion 184 is connected to the hollowed body 14 afterward. This allows the hollowed body 14 to have an extrusion-like shape before it is capped on one longitudinal side 42 to provide a half size utility cart body 14. Conversely, as explained above in reference with the full size utility cart 10, the upper wall portion 18, right lateral wall portion 22, left lateral wall portion 26 and bottom wall portion 30 interconnected with radius portions 32 are forming the body 14 of the full size utility cart 10.

The upper wall portion 18, right lateral wall portion 22, left lateral wall portion 26, bottom wall portion 30 are made of composite materials to provide a strong global mechanical resistance yet light weight full size utility cart 10 and/or half size utility cart 180. Composite materials are commonly known as reinforcement fibers fixed with a resin matrix. The composite material is advantageous for its lightweight; its anisometric structural benefits and for its thermal efficiency, thus providing a good thermal barrier between the inside of the utility cart 10 and the environment.

The present application can utilize a liquid Phenolic resin to infuse dry fabrics (e.g. fibers, reinforcement material, . . . ) in the composite layup by means of vacuum infusion molding. This enables to reduce the costs of materials while still enabling to mold the composite sandwich layup in a shape of a finished trolley. Additionally, Phenolic resin meets the numerous safety requirements for aviation applications.

Vacuum Infusion Process (VIP) is a common resin infusion fabrication method usable with Phenolic resin that uses vacuum pressure to drive liquid resin into dry fiber-reinforcement material. Materials are laid up dry into the mold and the vacuum is applied before resin is introduced. Once a complete vacuum is achieved, resin is literally sucked into the laminate via carefully placed resin-feed lines. The resin infusion process has been identified as a cost-effective fabrication technique for producing damage tolerant textile composites. Dry textile preforms are resin impregnated, consolidated and cured in a single step eliminating costly prepreg tape manufacture and ply-by-ply layup. VIP uses vacuum bag that is not reusable. The bag is placed over the part and is sealed around the perimeter of the mold with tacky-tape. The layup of material in the VIP consists of fiberglass woven cloth layers; a foam core; Phenolic resin and vacuum bagging accessories.

Continuing with FIG. 11, the forward edge 244 of the body 14 is shaped 248 to accommodate the front panel, on its upper wall portion 18 and lateral wall portions 22, 26. Additional forms/shapes 252 are performed on the right lateral portion 26 to receive the locking member 70 and the extending stem 82 as taught in an embodiment of the invention. Other forms could be performed on the body 14 to suit various other needs without departing from the scope of the present invention.

Still referring to FIG. 11, reinforcements 400, 404, 408 have a shape adapted to extend 416 to the lateral portions 22, 26. The extended shape of the reinforcements 400, 404, 408 helps to further distribute the energy of a mechanical load applied to the galley cart 10 to a wider portion of the body 14 while preventing the composite material of the body 14 to collapse. The illustrated embodiment of FIG. 11 has radius portions 32 defined between the lateral portions 22, 26 and the back portion 184. The shape of the reinforcements 400, 404, 408 is adapted to mate the shape of the radius portions 32 to be properly integrated into the body 14. Reinforcements 400, 404, 408 could be more or less wide depending on their mechanical resistance, the design of the body 14 and the expected mechanical load to be applied thereon. In an alternate embodiment (not shown), the radius portions 32 can have a different shape and even be 90-degree angled. In this alternate embodiment, the reinforcements 400, 404, 408 have a shape adapted to be embedded in the body 14. The extended reinforcements 400, 404, 408 can be made of a plurality of adjacent and/or cooperating reinforcements without departing from the scope of the present disclosure.

Further, in FIG. 11, it can be appreciated that the lower portion of the galley cart 10 is equipped with a series of cooperating reinforcements 400. The series of reinforcements 400 provides a significant mechanical resistance advantage to the body 14. A reinforcement 400 on a front side 420 of the body 14 can be connected to a rear side 424 of the body 14 via a junction member 428. Some areas 432 of the body 14 remain free of a reinforcement 400 if the expected mechanical load to be applied thereto does not require any reinforcement 400 and be sustained by the composite material alone. The reinforcements 400 can extend to more than one plane (e.g. from the lateral portions 22, 26 to the bottom portion 30 and further to the back portion 184) to create a multi-dimensional reinforcement 403. The multi-dimensional reinforcement 403 illustrated on the bottom of the body in FIG. 11 is preferably made of a unitary reinforcement 400 but can also be made of a few cooperating/assembled reinforcement parts. The unitary multi-dimensional reinforcement 403 can be machined or molded to the desired dimensions prior to be embedded in the body 14. A unitary multi-dimensional reinforcement 403 is equipped, if required, of discontinuities 436 therein to allow some dimensional variations at the time of infusing/molding/curing the unitary multi-dimensional reinforcement 400 with the composite material to create the body 14. These discontinuities 436 are typically ruptures in the unitary multi-dimensional reinforcement 403 intended to allow contraction or expansion of the body 14 at the time of molding, infusing and or curing. The unitary multi-dimensional reinforcement 403 can be made of more than one cooperating multi-dimensional reinforcement 403.

Figure 12:
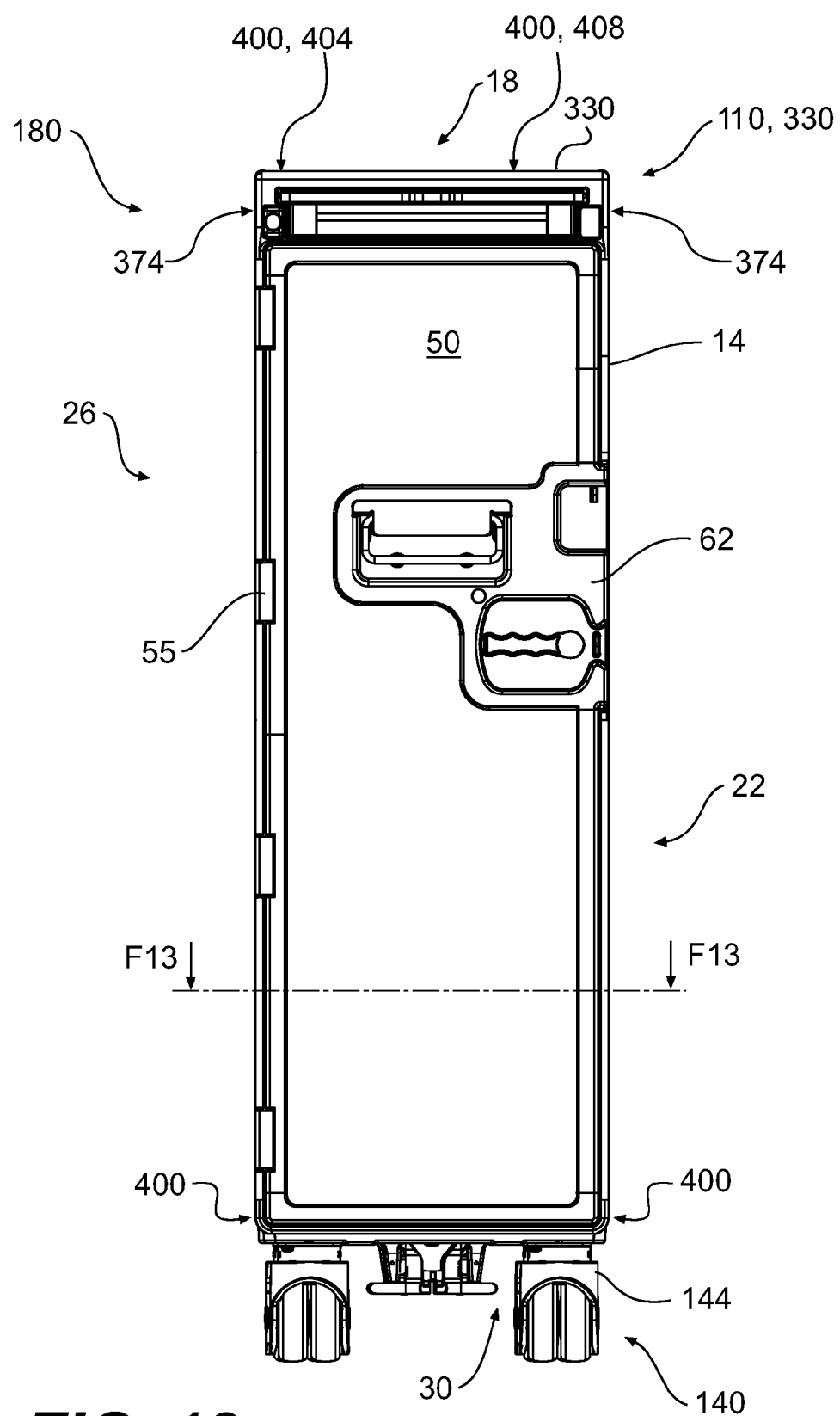
FIG. 12 is a front elevational view of a half size utility cart with reinforcements therein in accordance with an embodiment of the present invention.
Figure 13:
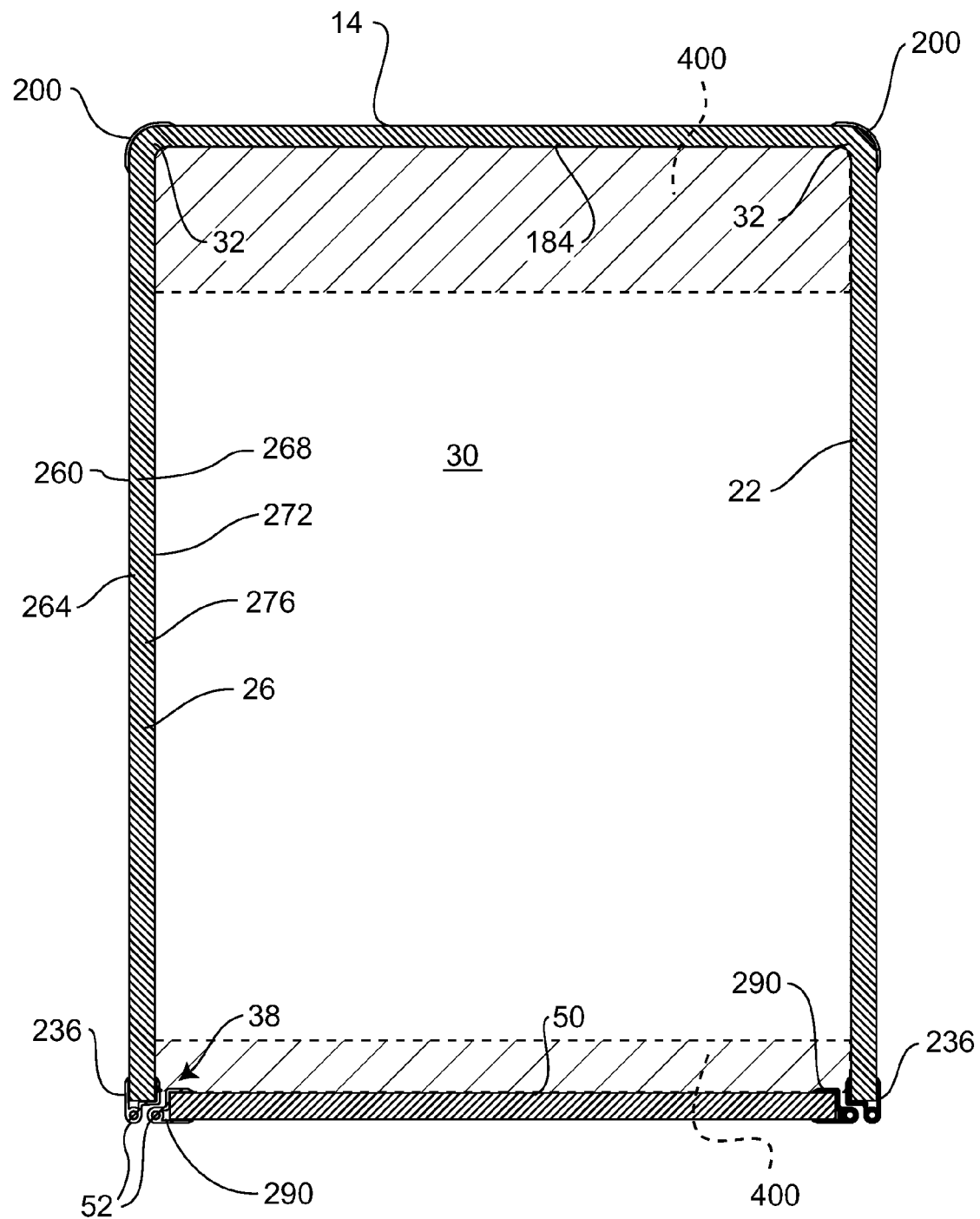
FIG. 13 is a sectional top plan view of a half size utility cart with reinforcements therein in accordance with an embodiment of the present invention.
Figure 14:
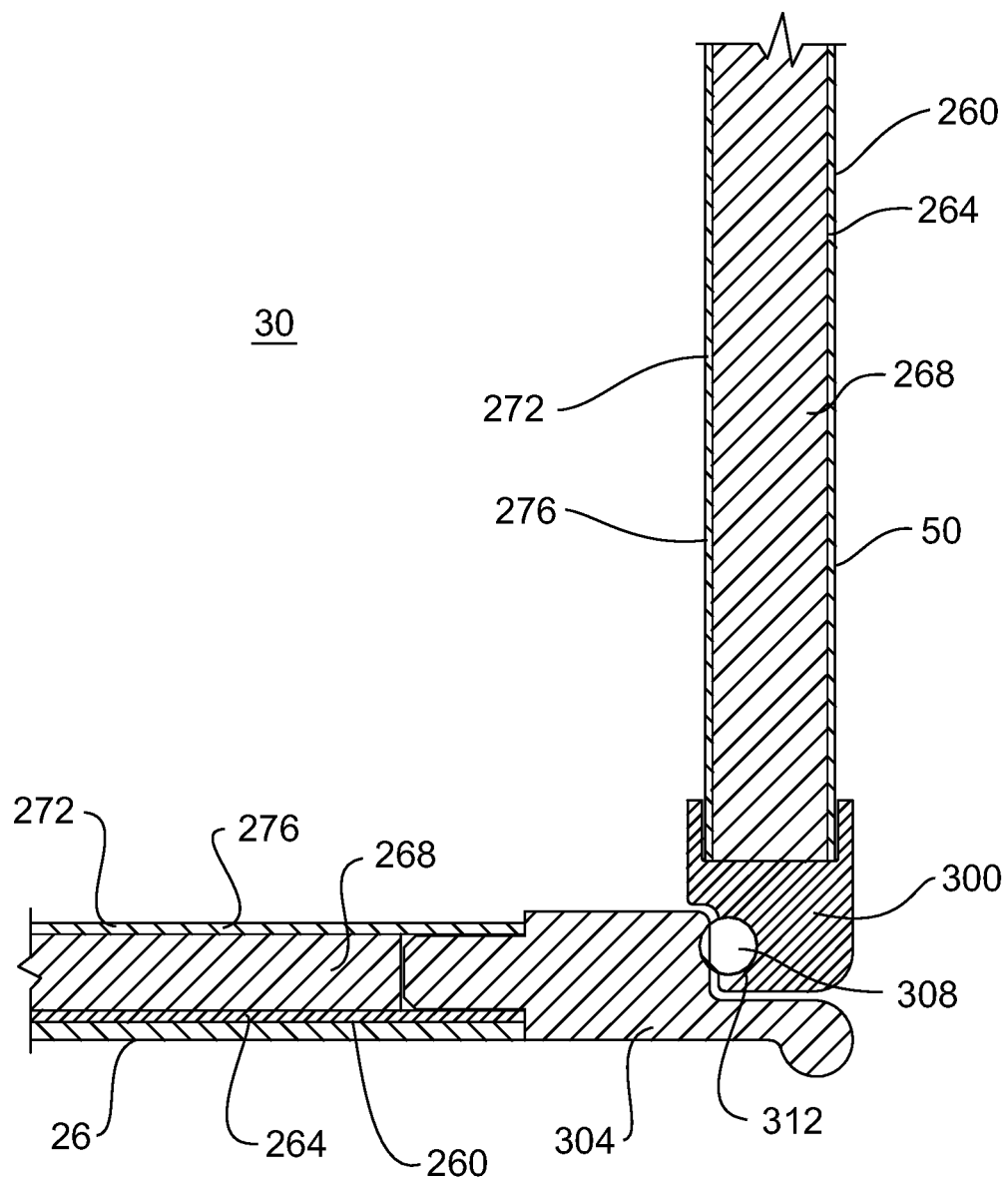
FIG. 14 is a sectional view of a portion of a door closure mechanism of a utility cart in accordance with an embodiment of the present invention.

FIG. 12 is an illustration of a half size utility cart 180 with an indication of the section area used by following FIG. 13 where it is possible to appreciate in more details the composition of the composite materials used in the utility cart body 14. This top plan view depicts the continuity between the left lateral wall portion 26, the back wall portion 184 and the right lateral wall portion 22. The radius portions 32 ensuring the composite wall continuity are well shown in FIG. 13 with their respective resilient member 200. The composite materials comprise, in an embodiment of the invention, a sandwich structure of an exterior finishing layer 260 used to protect the body 14 and improve its resistance to contacts with exterior objects while giving an alternate aesthetic finish to the body 14. An exterior layer 264 of fibers and Phenolic resin comes next with a central core 268 having the role of distancing the interior layer 272 of fibers and Phenolic resin from the center of the wall portion thus increasing the stiffness of the structure. An interior finishing layer 276 used to protect the body 14 and improve its resistance to contacts with interior objects. Still in reference with FIG. 13, one can appreciate that the door opening frame 236 of the door opening 38 and the door contour frame 290 are made of the same extruded material. In this embodiment of the invention the same extruded shape is complementarily used for the door-opening frame 236 and the door contour frame 290. The use of a single extruded shape of this embodiment simplifies the assembly and reduces the tooling cost. The shape of the extrusion depicted in FIG. 13 and in FIG. 14 are possible designs. The extruded material is aluminum although other equally suitable material could be used and still be considered within the scope of the present invention (e.g. plastic).

An alternate embodiment of the interface between the door opening frame 236 and the door contour frame 290 is illustrated in FIG. 14. Two different shapes of extrusion 300, 304 are used in this embodiment and a seal 308 (an "O" ring) has been inserted in a groove 312 properly sized and designed. This type of design improves the sealing of the door 50 with the body 14 to help improve thermal efficiency of the utility cart 10, 180.

Figure 15:
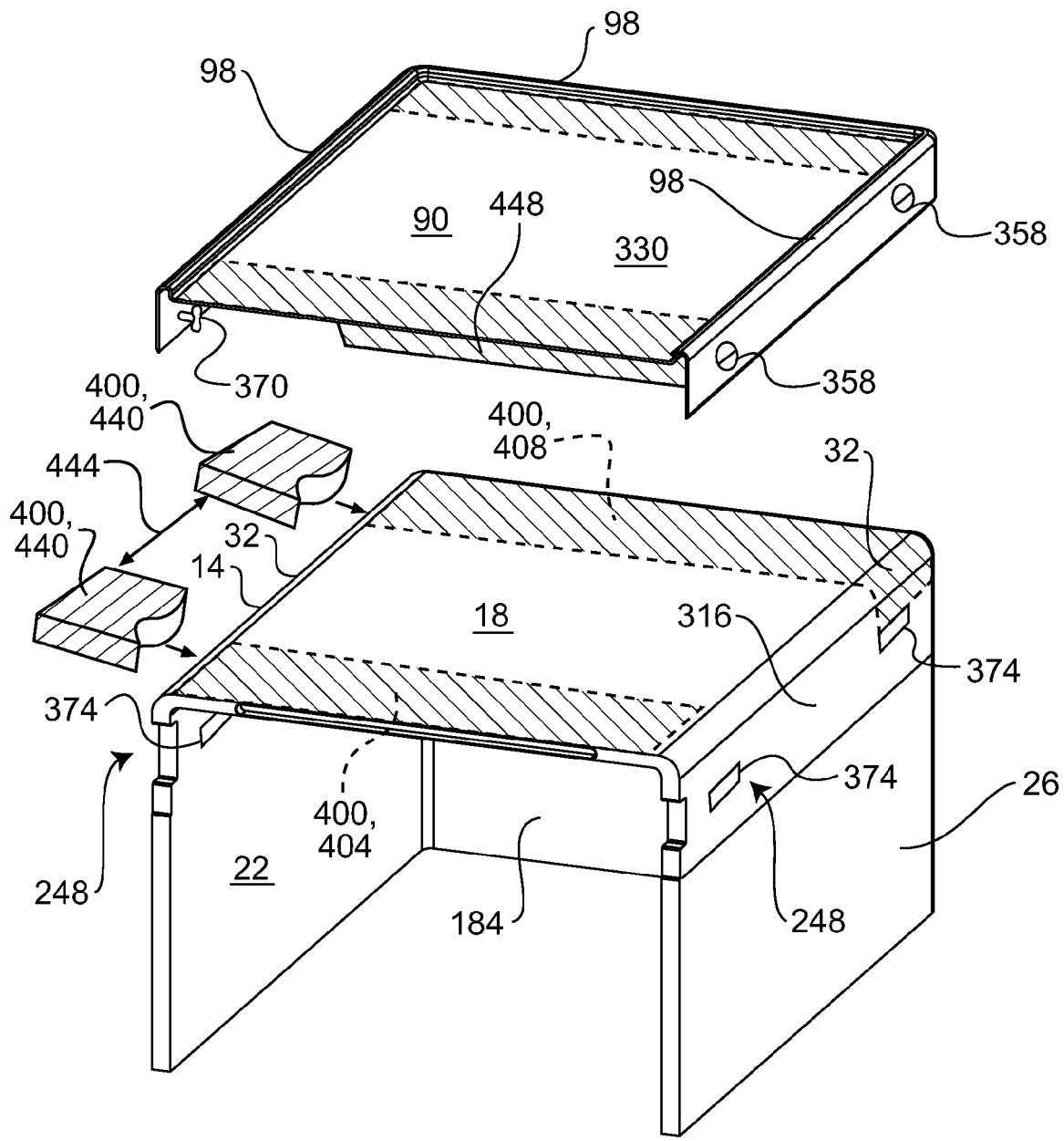
FIG. 15 is a magnified view of a upper portion of a half size utility cart with reinforcements therein in accordance with an embodiment of the present invention.

Moving now to FIG. 15 illustrating a more detailed exploded view of the cover element module 90 with the upper portion 18 of the body 14. The cover element module 90 is designed to slide fit the upper portion of the body 14 and be secured thereto with glue or fasteners. A recessed portion 316 having a depth significantly equivalent to the thickness of the cover element module 90 wall can optionally be performed in the body 14 to ensure an even exterior finish to reduce the risk of hooking exterior objects, like cloths or seat fabric material, when the utility cart 10, 180 is used. The cover element module 90 can alternatively be considered a utility module 330 in accordance with at least one embodiment.

Figure 17:
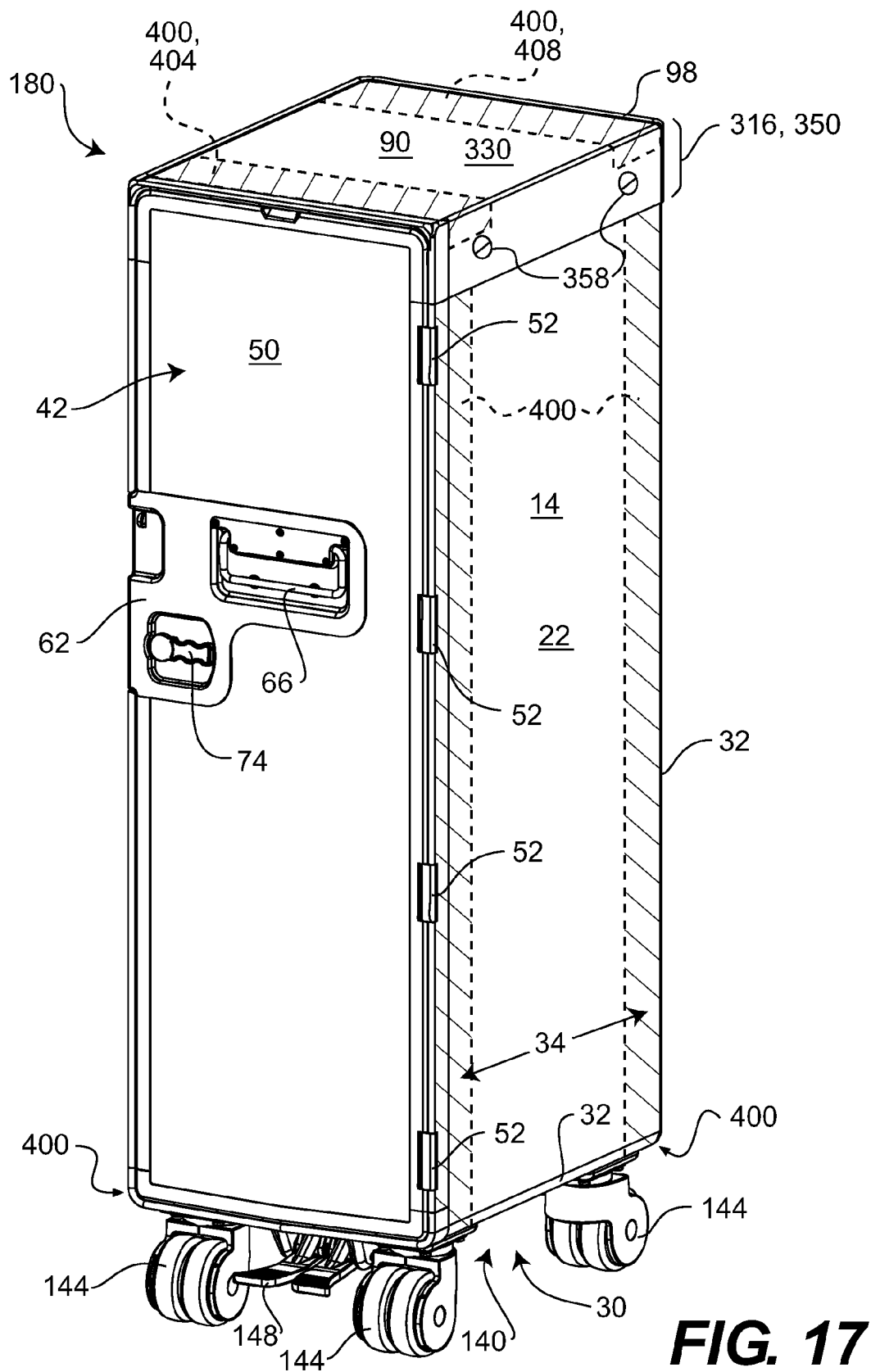
FIG. 17 is a perspective view of a body of a half size utility cart with reinforcements therein in accordance with an embodiment of the present invention.
Figure 18:
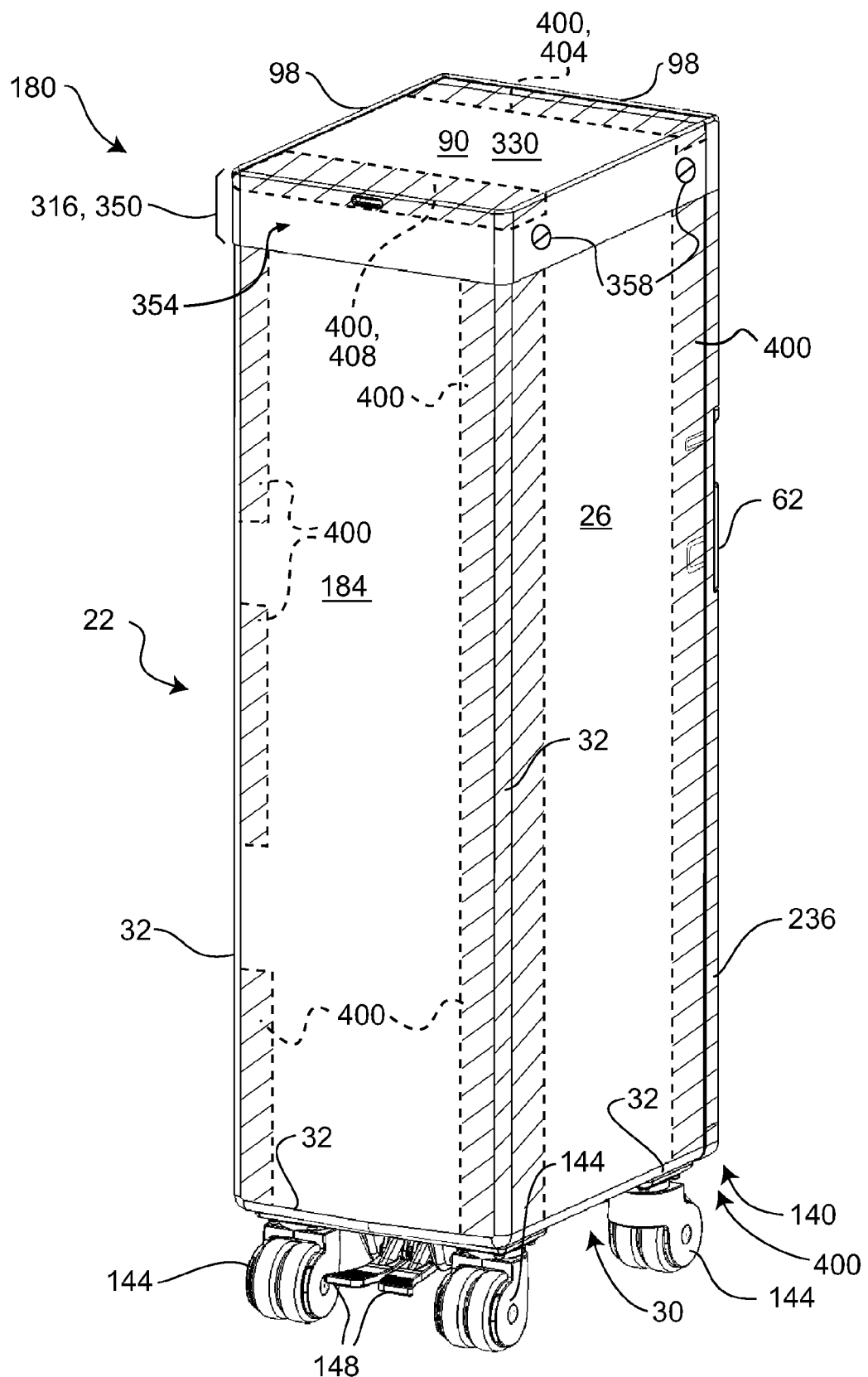
FIG. 18 is a rear perspective view of a body of a half size utility cart with reinforcements therein in accordance with an embodiment of the present invention.

In FIG. 15, reinforcements 400, 404, 408 are illustrated embedded on top of the body 14. A utility module 330 covers the reinforcements 400, 404, 408 and the upper portion 18 of the body 14. In contrast, non-embedded reinforcements 400, 440 can be secured on top of the upper portion 18, with, inter alia, glue, resin or fasteners and covered with the utility module 330 thus assembling the reinforcements 400, 404, 408 in the galley cart 10. A gap 444 between the utility module 330 and the upper portion 18 of the body 14 could remain between the two reinforcements 400 if other material does not fill it. Another alternate embodiment is to secure or embed the reinforcements 400 inside 448 the utility module 330 (note that the reinforcement 400 illustrated inside 448 the utility module 330 has been cut for illustrating the fastener 370 and extends over the width of the utility module 330). Once affixed to the body, the utility module 330 would significantly increase the strength of the body 14. A galley cart 10 with the utility module 330 installed thereon is shown in FIG. 17 and FIG. 18. A combination of these alternate embodiments remains within the scope of the present disclosure.

Figure 16:
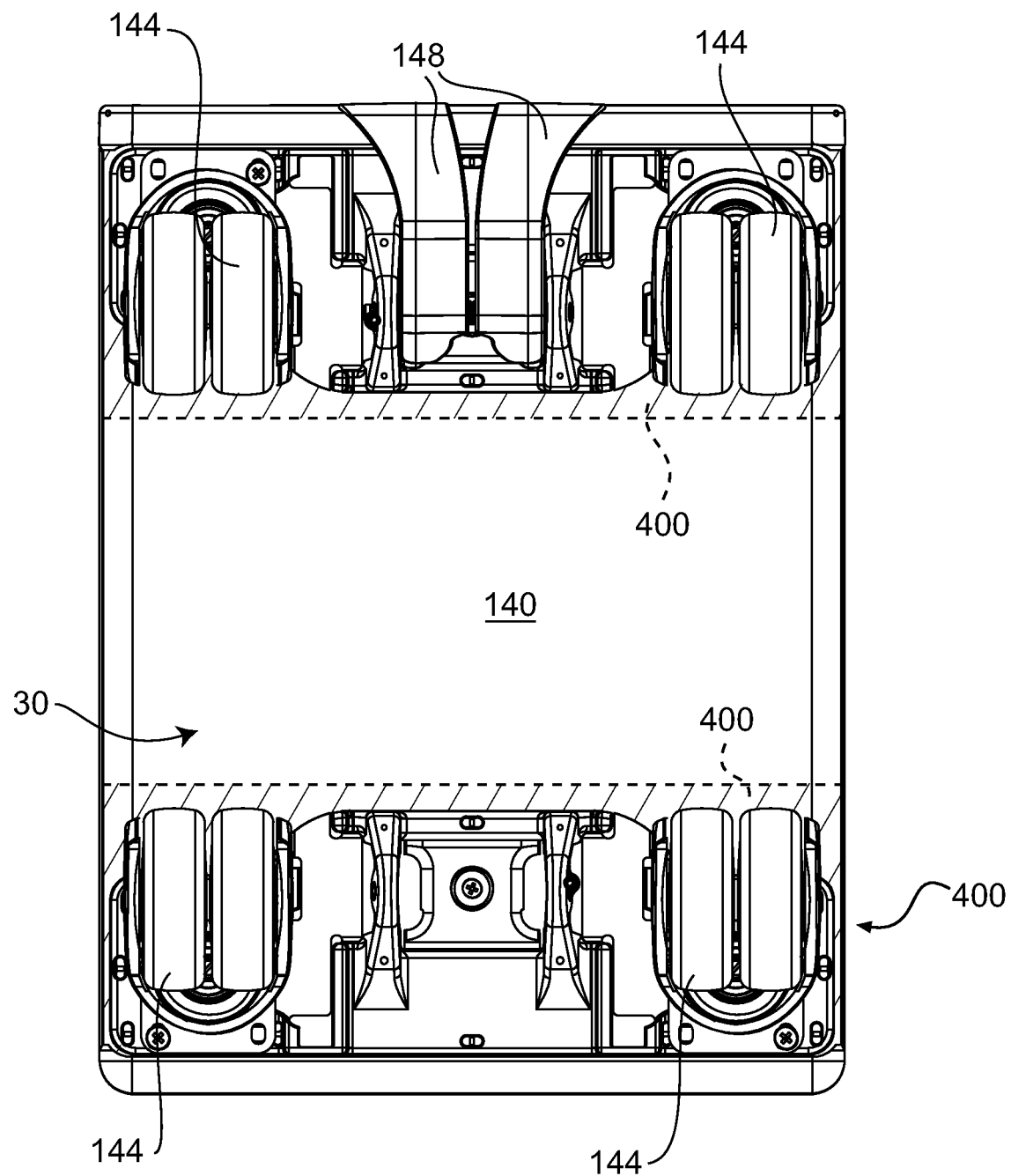
FIG. 16 is a bottom plan view of a half size utility cart with reinforcements therein in accordance with an embodiment of the present invention.

One embodiment of the invention providing a wheelbase 140 adapted to secure caster wheels 144 thereon is shown in FIG. 16. The wheelbase 140, as presented by the present embodiment, is a rigid panel member helping distributing the mechanical load from the body 14 to the caster wheels 144. The wheelbase 140 can be glued or secured with fasteners to the bottom portion 30 of the body 14. An alternate embodiment directly secures the caster wheels 140 to the body 14 and a reinforcement plate (not illustrated) disposed inside the body 14 adjacent to the bottom wall portion 30. The reinforcement plate helps distribute the load to the complete bottom wall portion 30. A quick release mechanism could alternatively be used to easily install and remove the wheelbase 140 from the body 14. The quick release mechanism is a set of three grooved members disposed under the bottom wall portion 30 and configured to slide therein the wheelbase 140. A locking mechanism (not illustrated) is provided to prevent the wheelbase 140 to slide out of the quick release mechanism. Otherwise, the caster wheels 144 can be directly mounted to the body 14 if the strength of the body 14 is sufficient. Here again, the wheelbase 140 can also alternatively be considered a utility module 330.

FIG. 17 and FIG. 18 are illustrating another embodiment of the invention. The half size utility cart 180 presented herein does not have a tablet module 110 therein. The body 14 of the half size utility cart 18 uses the entire volume for receiving goods therein. The door 50 consequently covers the complete longitudinal opening 42 and gives access, when opened, to the complete internal volume of the body 14. Height long reinforcements 400 are embedded in the body 14 to completely reinforce the vertical edges of the body 14 of FIG. 17. FIG. 18, in contrast, illustrates the discontinuous vertical reinforcements 400 and continuous vertical reinforcements 400.

Figure 19:
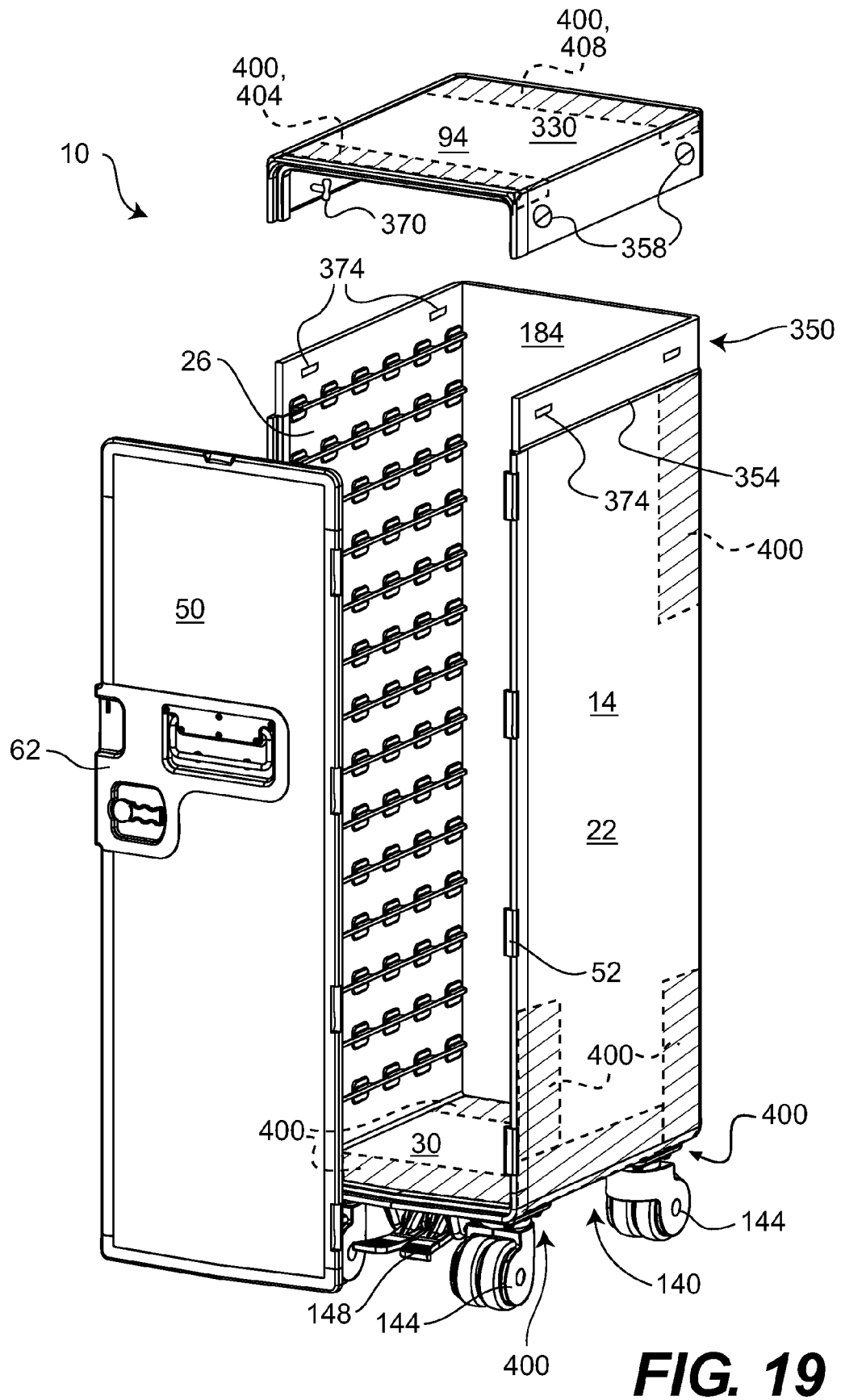
FIG. 19 is a perspective exploded view of a body of a half size utility cart with reinforcements therein in accordance with an embodiment of the present invention.

Turning now to FIG. 19 illustrating an alternate embodiment of a modular utility cart 10 provided with a body 14 and a utility module 330. The utility module 330 in accordance with embodiments of the invention is used to specialize the utility cart 10 for performing a task. The utility module 330 is adapted to be removably connected to the body 14 such that many utility modules 330 can be used in conjunction with a single body 14. Conversely, the utility module 330 can be permanently secured to the body 14 in accordance with embodiments of the invention.

As explained in connection with the embodiment illustrated in FIG. 2, the utility module 330 can be directly connected to the body 14. Alternatively, the body 14 is equipped of a module receptacle 350 to quickly remove/connect the utility module 330 to the body 14. The module receptacle 350 provides a positioning element 354 and the securing element 86 to locate the utility module 350 in respect with the body 14 and to secure the utility module 350 to the body 14. The embodiment of FIG. 19 illustrates a positioning element 354 in the shape of an edge on which rests the cooperating edge 362 of the utility module 330. The securing element in the embodiment of FIG. 19 is a rotating clip 366 provided with a "T" shaped fastener 370 sized and design to cooperate with slots 374 provided in the body 14. Turning 90 degree the rotating clip 366 locks the "T" shape fastener 370 in their respective cooperating slots 374. For example, the securing element 366 can be a quarter turn assembly fastener as illustrated in Spaenaur catalog, page L36, L37, Spaenaur number 110-064 that can be found at http://www.spaenaur.com/view_pdf.asp?Page=L37 with its mating member. Please note that the upper wall portion 18 has been removed on FIG. 19 to allow a better view of the body's 14 interior. In another embodiment, the upper wall portion 18 remains in the body 14 and the utility module 330 is secured thereon. Other fastener like the expandable fastener 440 that is going to be discussed later can be found at Spaenaur.com and other merchants.

Figure 20:
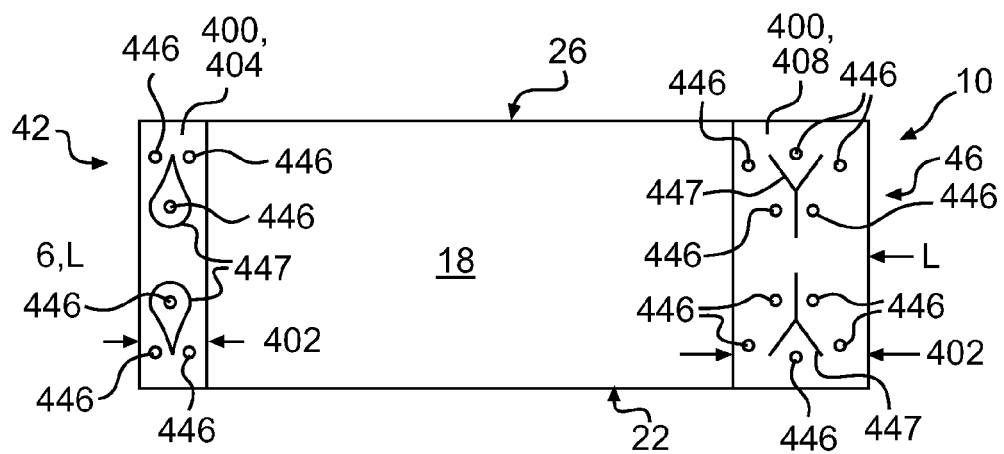
FIG. 20 is a schematic top plan view of a utility cart with reinforcements therein in accordance with an embodiment of the invention.

FIG. 20 depicts a schematic top plan view of an upper portion 18 with a reinforcement member 404 on a front side 42 and a reinforcement member 404 on a rear side 46. Both reinforcement members 404, 408 are of different widths 402 and offer different levels of mechanical stress resistance in response to the load "L" applied thereon. Illustratively, for Nylon™ material reinforcements 400, the width is about between 35 millimeters and 70 millimeters. Alternatively, the width of the reinforcements 400 can be more than 70 millimeters if required to sustain a more significant expected load "L" without departing from the scope of the present invention. Each reinforcements 400 is preferably located directly on the edge of the upper portion 18 to maximize its strength by directly receiving the load "L" and to prevent any superficial damages to the composite materials to the upper portion 18. The rectangular reinforcement members 404, 408 illustrated in FIG. 20 are symmetrically disposed on the longitudinal direction of the upper portion 18 of the utility cart 10.

The shape of the reinforcements 404, 408 shown in FIG. 20 is rectangular such that the thickness of the reinforcements 404, 408 can fit into the thickness of the upper portion 18 while providing sufficient longitudinal strength with the longer length. The reinforcements 404, 408 are provided with holes 446 therein to help distribute the resin around the solid reinforcement member 404, 408 and properly wet the fibers of the composite materials disposed around. The position and the size of the holes 446 can vary depending on the desired resin flow at the time of infusion/injection. Grooves, gutters and/or slots 447 can also be performed in the reinforcement member 404, 408 to improve the flow of resin around the reinforcement member 404, 408. The shape, size, depth and number of grooves, gutters and/or slots 447 can vary in accordance with the unique requirement of each structure for suitable resin distribution and air removal. The holes 446 and the gutters 447 can be used independently or collectively to reach the desired effect. Ideally, the holes 446 and the gutters 447 are disposed to improve and ease the flow of resin from the resin injection points (not illustrated in the Figures).

Figure 21:
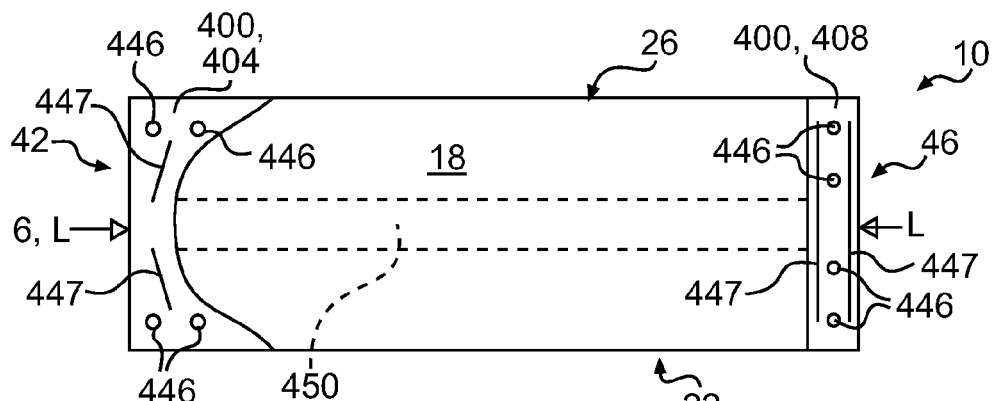
FIG. 21 is a schematic front elevational sectional view of a portion of a composite wall member with reinforcements therein in accordance with an embodiment of the invention.

FIG. 21 illustrates a reinforcement member 404 that is not rectangular. The shape of the reinforcement member 404 provides more material on each side and less in the middle to improve the load transfer to the lateral portions 22, 26. Also, the shape of the reinforcement 404 optimizes material distribution to avoid any unnecessary weight. Additionally, a junction member 450 is optionally provided to transmit some load (identified by the letter "L" and illustratively applied by a lock 6) to the opposed reinforcement 408 disposed on the other side of the galley cart 10. Here again holes 446 and gutters 447 are formed in the reinforcements 400.

Figure 22:
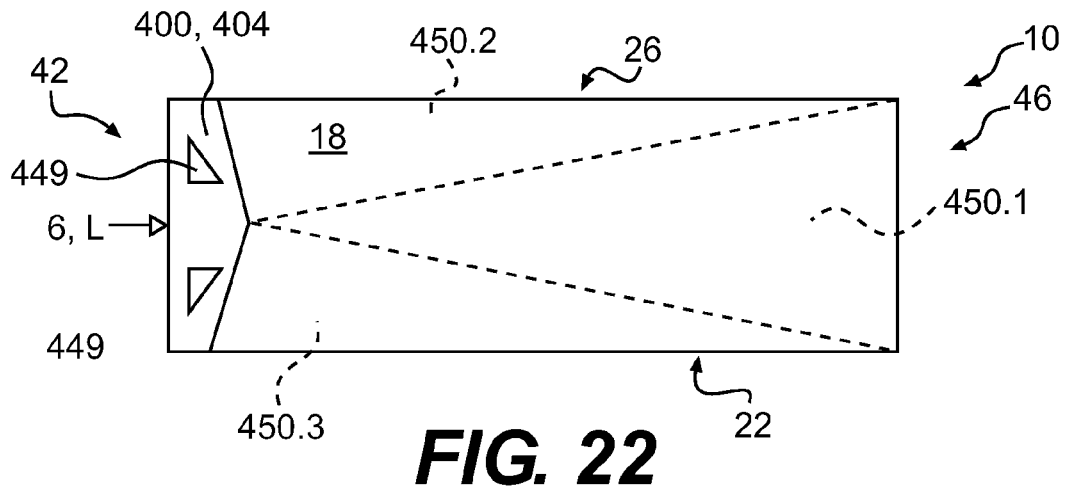
FIG. 22 is a schematic front elevational sectional view of a portion of a composite wall member with reinforcements therein in accordance with an embodiment of the invention.

An alternate design of reinforcement 404 and junction member 450 is depicted in FIG. 22. The shape of the reinforcement 404 has a shape having more material in the center thereof to properly sustain the load "L" applied thereon where the stress is the higher. Three different junction members 450.1, 450.2, 450.3 are illustrated in FIG. 22. They can have different shapes, thicknesses and use different materials in addition to be collectively or individually used. Junction member 450.1 has a triangular shape adapted to evenly transfer mechanical stress to the side portion opposed to the reinforcement 404. Symmetrical side portions 450.2 and 450.3 are adapted to distribute mechanical stress to the lateral portions 22, 26. Different shapes, thicknesses and different materials of reinforcement 400 can be used in consideration of variables like the type of material, the load application speed and the duration of the applied load. Additionally, the reinforcement 400, 404 is equipped with openings 449 therein where material is unnecessary to sustain loads applied to the reinforcements 400, 404, 408 in order to save weight on the utility cart 10. The size and the shape of each opening 449, which can be of non-identical shapes and sizes, can vary depending on the design of the reinforcement 400.

Turning now to FIG. 23 illustrating an embodiment of an upper portion 18 construction where a juxtaposed reinforcement member 400, 464 as explained above extends a foam core 460, on one of its ends. The reinforcement member 464 is illustratively covered with two layers of carbon fibers 468 to further increase its rigidity and ensure proper bonding with the remaining structure. Once the reinforcement member 464 is properly juxtaposed next to the foam core 460 it is covered by a series of additional layers of glass fibers 472 and/or carbon fibers 476 and further covered by a layer of glass veil 480. The number and the nature of the layers of fibers can vary in accordance with the expected load to be sustained without departing from the scope of the present disclosure.

The various layers of glass fibers 472 and carbon fibers 476 are disposed in a pattern adapted to assemble the foam core 460 and the reinforcement 400, 464. The fibers layers 472, 476 are also adapted to transform the foam core 460 into an upper portion 18 having a strong front edge adapted to sustain the stress applied by the lock 6 in case of impact. It can be appreciated that the layers of glass fibers 472 and carbon fibers 476 are wrapping the reinforcement 460, 464 and foam core 460 assembly. Some layers of glass fibers 472 and carbon fibers 476 of specific lengths are disposed at precise locations on the foam core 460 and on the reinforcement 400, 464 assembly. Some layers of fibers 472, 476 are covering the extremities of the foam core 460, connecting a reinforcement 400, 464 or even two distinct portions of foam core hence building additional thicknesses of material to increase the rigidity of the edge of the upper portion 18. One preferred layout of glass fibers 472 and carbon fibers 476 is illustrated in FIG. 23. Resin, preferably phenolic resin, is infused and cured to bond all the layers of glass fibers 472, carbon fibers 476 and glass veil 480 together. After, the upper portion 18 can be assembled with the other portions into a complete body 14.

An analogous construction of the bottom portion 30 is illustrated in FIG. 24. The bottom portion 30 uses Nylon™ reinforcement 400, 484 on both ends to increase the mechanical resistance of the bottom portion 30 at the front and at the rear. The illustrated layout of the upper portion 18 and the bottom portion 30 respectively embodied in FIG. 23 and FIG. 24 can be interchanged and remain encompassed by the scope of the present disclosure.

Turning now to FIG. 25 where is illustrated an upper portion 18 with a foam core 460 and an abutted reinforcement 400, 464. The reinforcement 400, 464 has a distal side provided with a radius 466 preventing any sharp corner that could break the fibers and retain air pocket in the composite materials. It can be appreciated on the left side two core foam portions 460 wrapped in their own layer of carbon fibers 476 and further covered and linked with additional layers of carbon fibers layers 476 to increase the resistance of this side of the upper portion 18 without using a Nylon™ reinforcement 400. The number of assembled cores 460, 484 and their precise layout differs from the previous embodiment illustrated in FIGS. 23 and 24. The sequence of layers of glass fibers 472 and carbon fibers 484 also differs from the previous embodiment.

FIG. 26 illustrates an alternate arrangement of parts replacing the two foam cores 460 of FIG. 25 with a single reinforcement 400, 484 abutted to the foam core 460 in FIG. 26. A layout of layers of fibers 466, 472 are connecting the reinforcement 400, 484 and the foam core 460 together. FIG. 27 illustrates an alternate shape of reinforcement 400 with a curved portion 490 extending to two straight portions 495 disposed on each side thereof. Finally, FIG. 28 illustrates another alternate layout of reinforcements 400 interconnected with an alternate junction member 450 that serves also as reinforcement 400.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A utility cart comprising a composite materials body including fibers and resin to form two side portions interconnecting an upper portion and a bottom portion adapted to secure ground-contacting members thereto, at least one of the portions including composite material and a reinforcement member discretely located therein to locally reinforce an area of the at least one of the portions, the reinforcement member being adapted to distribute a concentrated stress to prevent or reduce damages to the composite material.

2. The utility cart of claim 1, wherein the reinforcement member is abutted to a foam core.

3. The utility cart of claim 1, wherein the composite materials further comprise a foam core and wherein the composite materials comprise a layer of fibers adapted to secure the foam core and the reinforcement member together.

4. The utility cart of claim 1, wherein the reinforcement member includes Nylon material.

5. The utility cart of claim 1, wherein the utility cart is adapted to be removably stowed in a galley and secured therein with a lock, the reinforcement member being disposed next to an edge of the utility cart that is adapted to be in contact with the lock.

6. The utility cart of claim 1, wherein the reinforcement member is provided with openings adapted to facilitate the flow of resin thereabout.

7. The utility cart of claim 1, wherein the reinforcement member is a plurality of reinforcement members interconnected with a junction member therebetween to transfer the load applied to a first reinforcement member to a second reinforcement member.

8. The utility cart of claim 1, wherein the reinforcement member includes a hollowed portion.

9. The utility cart of claim 1, wherein the reinforcement member includes a radius on one side thereof.

10. The utility cart of claim 1, wherein the reinforcement member is wrapped in a first layer of composite materials and then wrapped in a second layer of composite materials within the composite materials body.

11. The utility cart of claim 1, wherein the reinforcement member is aligned with a plane defined by a composite materials body portion and wherein a layer of fibers overlaps the reinforcement member and the composite materials body portion.

* * * * *